US011323386B2

(12) United States Patent
Dannebro et al.

(10) Patent No.: US 11,323,386 B2
(45) Date of Patent: May 3, 2022

(54) METHOD AND NODE FOR HANDLING QOS INFORMATION

(71) Applicant: Telefonaktiebolaget LM Ericsson (publ), Stockholm (SE)

(72) Inventors: Patrik Dannebro, Hisings Kärra (SE); Åsa Larsen, Hisings Backa (SE); Lars-Bertil Olsson, Angered (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 82 days.

(21) Appl. No.: 16/611,749

(22) PCT Filed: May 9, 2018

(86) PCT No.: PCT/EP2018/062009
§ 371 (c)(1),
(2) Date: Nov. 7, 2019

(87) PCT Pub. No.: WO2018/206647
PCT Pub. Date: Nov. 15, 2018

(65) Prior Publication Data
US 2020/0112522 A1    Apr. 9, 2020

Related U.S. Application Data

(60) Provisional application No. 62/503,462, filed on May 9, 2017.

(51) Int. Cl.
*H04L 12/927* (2013.01)
*H04L 47/80* (2022.01)
(Continued)

(52) U.S. Cl.
CPC ........ *H04L 47/805* (2013.01); *H04L 47/2441* (2013.01); *H04W 28/10* (2013.01);
(Continued)

(58) Field of Classification Search
None
See application file for complete search history.

(56) References Cited

U.S. PATENT DOCUMENTS

2013/0170350 A1* 7/2013 Sarkar ................. H04L 47/2475
370/235
2014/0177535 A1* 6/2014 Tjandra ................. H04W 28/16
370/329
(Continued)

FOREIGN PATENT DOCUMENTS

CN         102833729 B   *  5/2016
WO    WO-2012041129 A1   *  4/2012 ............ H04W 28/24

OTHER PUBLICATIONS

3GPP, 3rd Generation Partnership Project; Technical Specification Group Services and System Aspects; Study on Architecture for Next Generation System (Release 14), Dec. 2016, 3GPP TR 23.799 V14.0.0 (Year: 2016).*

(Continued)

*Primary Examiner* — Michael K Phillips
(74) *Attorney, Agent, or Firm* — Rothwell, Figg, Ernst & Manbeck, P.C.

(57) ABSTRACT

The embodiments herein relate to a method performed by a first node (103, 105) for handling Quality of Service, QoS, information. The first node (103, 105) receives information for a 5G QoS flow from a second node (108). The information comprises 5G or 4G QoS information, or both 5G and 4G QoS information, or priority information. The first node (103, 105) determines whether there are any available 4G bearer IDs. When there are no available 4G bearer IDs, the first node (103, 105) determines an action for handling the information.

10 Claims, 21 Drawing Sheets

(51) Int. Cl.
| | |
|---|---|
| *H04W 76/11* | (2018.01) |
| *H04L 47/2441* | (2022.01) |
| *H04W 28/10* | (2009.01) |
| *H04W 36/00* | (2009.01) |
| *H04W 36/14* | (2009.01) |
| *H04W 48/18* | (2009.01) |

(52) U.S. Cl.
CPC ... *H04W 36/0022* (2013.01); *H04W 36/0027* (2013.01); *H04W 36/14* (2013.01); *H04W 48/18* (2013.01); *H04W 76/11* (2018.02)

(56) References Cited

U.S. PATENT DOCUMENTS

| | | | | |
|---|---|---|---|---|
| 2014/0204736 | A1* | 7/2014 | Bakker | H04W 28/0215 370/230 |
| 2015/0382264 | A1* | 12/2015 | Cho | H04W 36/22 370/338 |
| 2017/0034749 | A1* | 2/2017 | Chandramouli | H04W 36/0055 |
| 2017/0332282 | A1* | 11/2017 | Dao | H04W 72/087 |
| 2018/0020386 | A1* | 1/2018 | Chandramouli | H04W 36/0027 |
| 2018/0041936 | A1* | 2/2018 | Kim | H04L 5/0053 |
| 2018/0242136 | A1* | 8/2018 | Lu | H04W 8/02 |
| 2018/0288233 | A1* | 10/2018 | Tamura | H04W 4/24 |
| 2018/0332462 | A1* | 11/2018 | Kim | H04W 28/02 |
| 2018/0376384 | A1* | 12/2018 | Youn | H04W 36/14 |
| 2019/0058997 | A1* | 2/2019 | Futaki | H04W 36/26 |
| 2019/0141591 | A1* | 5/2019 | Wu | H04W 36/04 |
| 2019/0230554 | A1* | 7/2019 | Kang | H04W 76/25 |
| 2020/0015130 | A1* | 1/2020 | Wang | H04W 36/0016 |
| 2020/0037197 | A1* | 1/2020 | Cho | H04W 76/30 |
| 2020/0077356 | A1* | 3/2020 | Youn | H04W 8/065 |
| 2020/0084744 | A1* | 3/2020 | Youn | H04W 76/30 |

OTHER PUBLICATIONS

Intel, "23.502: QoS mapping for 5GC-EPC interworking", 3GPP TSG SA WG2 Meeting #120; S2-171962, Mar. 27-31, 2017, Busan, Korea. (10 pages).

CATT, "TS 23.502: Discussion on EPS bearer ID allocation during inter-RAT handover from 5GS to EPS", SA WG2 Meeting #120; S2-172175; Mar. 27-31, 2017, Busan, Korea. (6 pages).

CATT, "Discussion on inter-system handover", 3GPP TSG-RAN WG3#96; R3-171544; Hangzhou, P.R. China, May 15-19, 2017. (3 pages).

Kim, J. et al., "3GPP SA2 architecture and functions for 5G mobile communication system", The Korea Institute of Communications and Information Sciences; ICT Express 3 (2017) 1-8. (8 pages).

International Search Report and Written Opinion dated Jul. 19, 2018 issued in Japanese Patent Application No. PCT/EP2018/062009. (13 pages).

\* cited by examiner

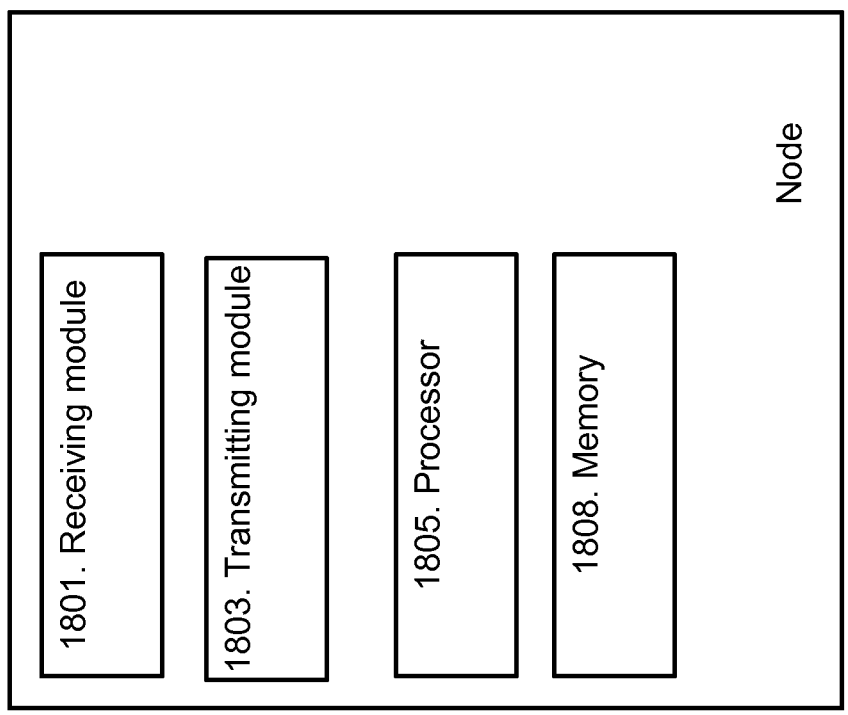

METHOD AND NODE FOR HANDLING QOS INFORMATION

CROSS REFERENCE TO RELATED APPLICATIONS

This application is a 35 U.S.C. § 371 National Stage of International Patent Application No. PCT/EP2018/062009, filed May 9, 2018, designating the United States and claiming priority to U.S. provisional application No. 62/503,462, filed on May 9, 2017. The above identified applications are incorporated by reference.

TECHNICAL FIELD

Embodiments herein relate generally to a first node, a method performed by the first node, a second node and a method performed by the second node. More particularly the embodiments herein relate to handling Quality of Service (QoS) information.

BACKGROUND

According to the Third Generation Partnership Project (3GPP), a Fifth generation (5G) System is defined as "a 3GPP system consisting of 5G Access Network (AN), 5G Core Network and UE" (ref. chapter 3 in 3GPP TS 23.501 V0.4.0 (2017-04)). It further defines the 5G system to "support data connectivity and services enabling deployments to use techniques such as e.g. Network Function Virtualization and Software Defined Networking. The 5G System architecture shall leverage service-based interactions between Control Plane (CP) Network Functions where identified." 5G may also be referred to as New Radio (NR).

Currently, the 5G system is being standardized by the 3GPP). It is expected that the system allows mobility between the Evolved Packet System (EPS) and the 5G system. EPS is also referred to as a Fourth Generation (4G) System. The 5G core network is able to i.a. assign more resources to a User Equipment (UE) than what is supported by EPC.

At an access change from 5G to 4G, it's necessary to ensure that the set of 5G UE resources made available to 4G are limited to what the 4G system is able to handle. In the 5G system, the UE may be provided with multiple Packet Data Unit (PDU) sessions, each with multiple QoS flows. At an access change from 5G to 4G these are translated to the nearest equivalents which are the PDU Connection and the 4G bearers. A 4G system supports a maximum of 8 4G bearers and a Packet Data Network (PDN) Connection is realized using at least one default 4G bearer. A PDN Connection may in addition make use of dedicated 4G bearers to achieve QoS differentiation in user data transport. At an access change from 5G to 4G, PDU Sessions in 5G are translated to 4G PDN Connections and their mandatory default 4G bearer and 5G QoS flows are translated into 4G equivalents of dedicated 4G bearers.

The term 5G QoS flow used above is defined by the 3GPP as "The finest granularity for QoS forwarding treatment in the 5G System. All traffic mapped to the same 5G QoS Flow receive the same forwarding treatment (e.g. scheduling policy, queue management policy, rate shaping policy, RLC configuration, etc.). Providing different QoS forwarding treatment requires separate 5G QoS Flow." (ref. chapter 3 in 3GPP TS 23.501 V0.4.0 (2017-04)). The 5G QoS flow is identified by a QoS Flow Identity (QFI). A 5G QoS flow comprises a certain 5G QoS. In general, QoS defines priorities for certain customers/services during the time of high congestion in the network. Examples of the QoS information is: Guaranteed Bit Rate (GBR), non-Guaranteed Bit Rate (non-GBR), Priority Handling, Packet Delay Budget and Packet Error Loss rate etc.

An issue is when the UE is provided with a combination of more than 8 PDU Sessions and QoS flows by the 5G system. In that case it is not possible to make all of them available via the 4G system after the UE performs an access change to 4G. To address that scenario, the system must ensure that a max of 8 PDU Sessions is translated to a 4G representation at an access change to 4G. At doing so it is also necessary to ensure that the 5G resources are prioritized such that resources with high priority and which are possible to make available via the 4G access, are maintained and translated.

3GPP has in work with 3GPP standard release 15 decided that 4G QoS information and 4G bearer Identity (ID) shall be assigned at 5G QoS flow setup when network resources of a 5G QoS flow should remain available to the UE after an access change to 4G and EPS. The assignment of 4G specific parameters is done at setup of a 5G QoS flow, i.e. prior to a mobility event of an access change to 4G and EPS. 4G specific parameters elaborated in this context are 4G QoS information and 4G bearer ID. The Session Management Function+PDN Gateway-Control plane (SMF+PGW-C) allocates and assigns 4G specific parameters to 5G QoS flows that should remain available to a UE after an access change to 4G and EPS. The terms allocation and assigning in relation to 4G parameters are used interchangeably herein.

As mentioned earlier, the 4G EPC parameter "4G bearer ID" is by 4G limited to support a max of 8 simultaneous 4G bearer IDs. To avoid exceeding this limit it is necessary that there are at most 8 4G bearer IDs assigned to a UE at the access change to 4G. There are 11 possible values for the 4G bearer ID from which a maximum of 8 may simultaneously be used for a UE served in the 4G access.

An issue is when the UE or the network requests to establish a new 5G QoS flow suitable for use in a 4G access and the UE is assigned 8 4G bearer IDs. This may occur when:
  The SMF+PGW-C attempts to setup a new network initiated 5G QoS flow.
  The UE requests to establish a new PDU Session.

The issue of reaching a maximum number of 4G bearer IDs can occur in legacy 4G, this as a consequence of that a PGW is not aware of the number of 4G bearer IDs in use. In 4G it is the Mobility Management Entity (MME) that assigns the 4G bearer ID and is also aware of the number of 4G bearer IDs in use for a UE, and from is by that able to prevent activating more 4G bearers than supported by 4G. Note that the 3GPP 4G standard maximum of 8 simultaneously active 4G bearers for a UE may be further restricted to a lower number of simultaneously active 4G bearers for a UE by the Evolved UTRAN (EUTRAN) access and/or the EPC. UTRAN is short for UMTS Terrestrial Radio Access Network, and UMTS is short for Universal Mobile Telecommunications System.

In the 4G, the MME resolves an attempt to activate too many 4G bearers by:
  Rejecting a bearer setup procedure towards the PGW. There is a specific cause code in the General Packet Radio Services (GPRS) Tunneling Protocol version 2 (GTPv2) protocol defined as "Request rejected due to UE capability", and/or by
  Attempting to pre-empt (remove, deactivate) an already established 4G bearer prior to activating a new. The MME may use the 4G bearer QoS of the UE's 4G bearers to determine their relative priority order, and execute pre-emption by using the Delete bearer Command procedure inside the Create bearer Request procedure.

For the Access Management Function (AMF) to be able to assign the Session Management (SM)-related parameter 4G bearer ID, the AMF must interact with SM procedures. If a max of 8 4G bearer IDs are assigned the AMF must be allowed to have access to SM-related information to prioritize between SM-resources, i.e. the AMF cannot be limited to act as a server which provides 4G bearer IDs to a requesting SMF+PGW-C.

There are limitations in SM-related AMF logic. For example, the AMF could make use of a full 5G Core Network (5GC) UE context data and mimic the decisions and behavior of the MME, i.e. to delete excessive flows. However, 3GPP SA2 seems determined to as far as possible use a 5GC architecture with a Mobility Management-Session Management (MM-SM) separation such that AMF is kept unaware of SM functions. So this is an unlikely scenario.

A 5G mechanism which addresses the 4G limitation is to let the 5G procedure reject or pre-empt a 5G QoS flow with 4G parameters with lower priority. That would, however, result in that also the corresponding 5G flow is removed. The effect would be that the UE would be prevented use of this resource while remaining in the 5G access and that is not acceptable.

Therefore, there is a need to at least mitigate or solve this issue.

SUMMARY

An objective of embodiments herein is therefore to obviate at least one of the above disadvantages and to provide improved handling of QoS information in relation to 4G and 5G.

According to a first aspect, the object is achieved by a method performed by a first node for handling QoS information. The first node receives information for a 5G QoS flow from a second node. The information comprises 5G or 4G QoS information, or both 5G and 4G QoS information, or priority information. The first node determines whether there are any available 4G bearer IDs. When there are no available 4G bearer IDs, the first node determines an action for handling the information.

According to a second aspect, the object is achieved by a method performed by a second node for handling QoS information. The second node sends information for a 5G QoS flow to a first node. The information comprises 5G or 4G QoS information, or both 5G and 4G QoS information, or priority information Embodiments herein afford many advantages, of which a non-exhaustive list of examples follows:

One advantage of the embodiments herein is that the prioritization of 4G resources is done in advance of an access change and therefore at a not time critical moment.

Another advantage of the embodiments herein is that it is only targeting the 4G aspects of the 5G request and thereby avoids a direct logical impact on the 5G request.

Another advantage of the embodiments herein is that the do not impact the UE.

An advantage of the embodiments herein is that it is only targeting deactivation (removal) of the 4G aspects an already established resource and thereby avoids direct impact on the 5G QoS flow.

Furthermore, an advantage of the embodiments herein is that the SMF is informed about that the resource will not be made available to the 4G system and the SMF may then decide to a) continue the 5G request, or b) to stop the request in case a 4G access to the resources is required.

An additional advantage of the embodiments herein by letting the AMF perform the prioritization is that AMF has access to information which enables it to perform a prioritization. There is no extra signaling over air to address a partial reject of 4G properties.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 17b is a continuation of the signaling diagram in FIG. 17a.

FIG. 18 is a schematic block diagram illustrating embodiments of a node.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to handling of 4G properties in 5G. In other words, it relates to a 4G reject from a 5G procedure or how the 4G bearer ID assignment is done in a 5G System (5GS) to enable mobility from 5GS to 4GS. Note that a 4G system is also referred to as an EPS system, and that the terms EPS and 4G are used interchangeably herein. Thus, a 4G bearer ID may also be referred to as an EPS bearer ID (EBI).

3GPP has proposed that the 5G system assigns 4G properties at the time when these 5G resources are assigned for the UE. The 4G properties consist of two elements:
1) 4G QoS: It is assumed that when the AMF receives a request for assigning 5G resources, and the flow is applicable for continuation in 4G, the 4G QoS information is also received.
2) 4G bearer ID: The AMF assigns a 4G bearer ID and keeps track of that the limit of maximum 8 4G bearers supported by a 4G system is not violated.

The terms assigning and allocating are used interchangeably herein.

The AMF can interact at each event of 5G resource allocation and can intervene with regards to 4G properties such that:
1) The AMF rejects the 4G properties of a 5G resource allocation request for low prioritized requests.
2) The AMF deactivates (removes) 4G resources allocated for a UE when more prioritized resources are requested; this when the 4G "resource ceiling" of max 8 4G bearers has been reached for the UE.

This selective reject of only 4G properties for a 5G request of use in the 5G access enables the UE and the 5G network to operate unaffected as long as the UE remains served by the 5G access. Furthermore, this selective deactivation (removal) of only 4G resources allocated for a UE when more prioritized resources are requested, also enables the UE and the 5G network to operate unaffected as long as the UE remains served by the 5G access. If the UE later attempts to change access from 5G to 4G, only resources that are provided with 4G properties are subject to be translated and made available in 4G.

Figure 1A:
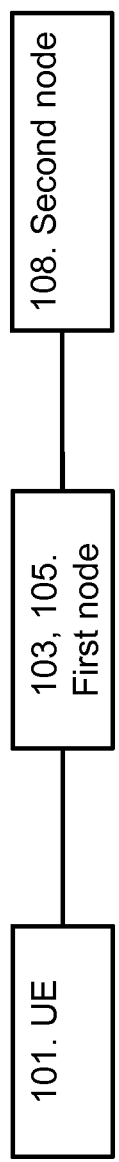
FIG. 1a is a schematic block diagram illustrating embodiments of a system.

FIG. 1a depicts a communication system 100 in which embodiments herein may be implemented. The system comprises a UE 101 served by an Access Node (AN) node (not illustrated in FIG. 1a). The AN node may also be referred to as a Radio Access Network (RAN) node. The AN node may be seen as being comprised in a 5G RAN. The 5G RAN may, in addition to non-3GPP AN, be comprised in a 5G Access Network (5G AN). The 5G Access Network may be connecting to a 5G Core Network. The AN node may be referred to as an evolved Node B (enB), gNodeB etc.

The communication system 100 may be referred to as a 5G system, which is defined by the 3GPP as "a 3GPP system consisting of 5G Access Network (AN), 5G Core Network and UE" (see chapter 3 in 3GPP TS 23.501 V0.4.0 (2017-04)).

The UE 101 may be a device by which a subscriber may access services offered by an operator's network and services outside operator's network to which the operators radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (loT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

As seen in FIG. 1a, the UE 101 is configured to be connected to a first node 103, 105, and the first node 103, 105 is configured to be connected to a second node 108. The first and second nodes 103, 105, 108 may each be seen as a node, a function, a node implementing a function etc.

The first node 103, 105 may be exemplified by an AMF, a mobility management node, a Mobility Management Entity (MME), an AN node etc. The second node 108 may be exemplified by a Session Management Function (SMF), a gateway, a PGW etc. According to 3GPP TS 23.501 V0.4.0 (2017-04), the SMF may have at least one of the following functionalities:

Session Management e.g. Session establishment, modify and release, including tunnel maintain between the User Plane Function (UPF) and the AN node.

UE Internet Protocol (IP) address allocation & management, including optional Authorization.

Selection and control of User Plane (UP) function.

Configures traffic steering at the UPF to route traffic to proper destination.

Termination of interfaces towards Policy control functions.

Control part of policy enforcement and QoS.

Lawful intercept, for SM events and interface to a Lawful Interception (LI) System.

Termination of SM parts of Non-access stratum (NAS) messages.

Downlink Data Notification (DDN).

Initiator of AN specific SM information, sent via the AMF over N2 to the AN.

Determine Session and Service Continuity (SSC) mode of a session.

Roaming functionality:
Handle local enforcement to apply QoS Service Level Agreements (SLA), e.g. VPLMN.
Charging data collection and charging interface, e.g. VPLMN.
Lawful intercept in VPLMN for SM events and interface to the LI System.
Support for interaction with external Data Network (DN) for transport of signalling for PDU session authorization/authentication by an external DN.

According to 3GPP TS 23.501 V0.4.0 (2017-04), the AMF may have at least one of the following functionalities:
Termination of RAN Control Plane (CP) interface, e.g. N2.
Termination of NAS, e.g. N1, NAS ciphering and integrity protection.
Registration management.
Connection management.
Reachability management.
Mobility Management.
Lawful intercept for AMF events and interface to the LI System.
Provide transport for SM messages between the UE and the SMF.

Transparent proxy for routing SM messages.

Access Authentication.

Access Authorization.

Provide transport for Short Message Service (SMS) messages between the UE and the Short Messaging Service Function (SMSF).

Security Anchor Function (SEA). It interacts with the Authentication Server Function (AUSF) and the UE, receives the intermediate key that was established as a result of the UE authentication process. In case of (Universal Subscriber Identity Module (USIM) based authentication, the AMF retrieves the security material from the AUSF.

Security Context Management (SCM). The SCM receives a key from the Security Anchor Function (SEA) that it uses to derive access-network specific keys.

Functionalities to support non-3GPP access networks.

It should be noted that the communication links in the communications system 100 may be of any suitable kind including either a wired or wireless link. The link may use any suitable protocol depending on type and level of layer, e.g. as indicated by the OSI model, as understood by the person skilled in the art.

The communication system 100 may comprise additional entities in addition to the ones in FIG. 1a. Examples of such entities are illustrated in FIG. 1b.

Figure 1B:
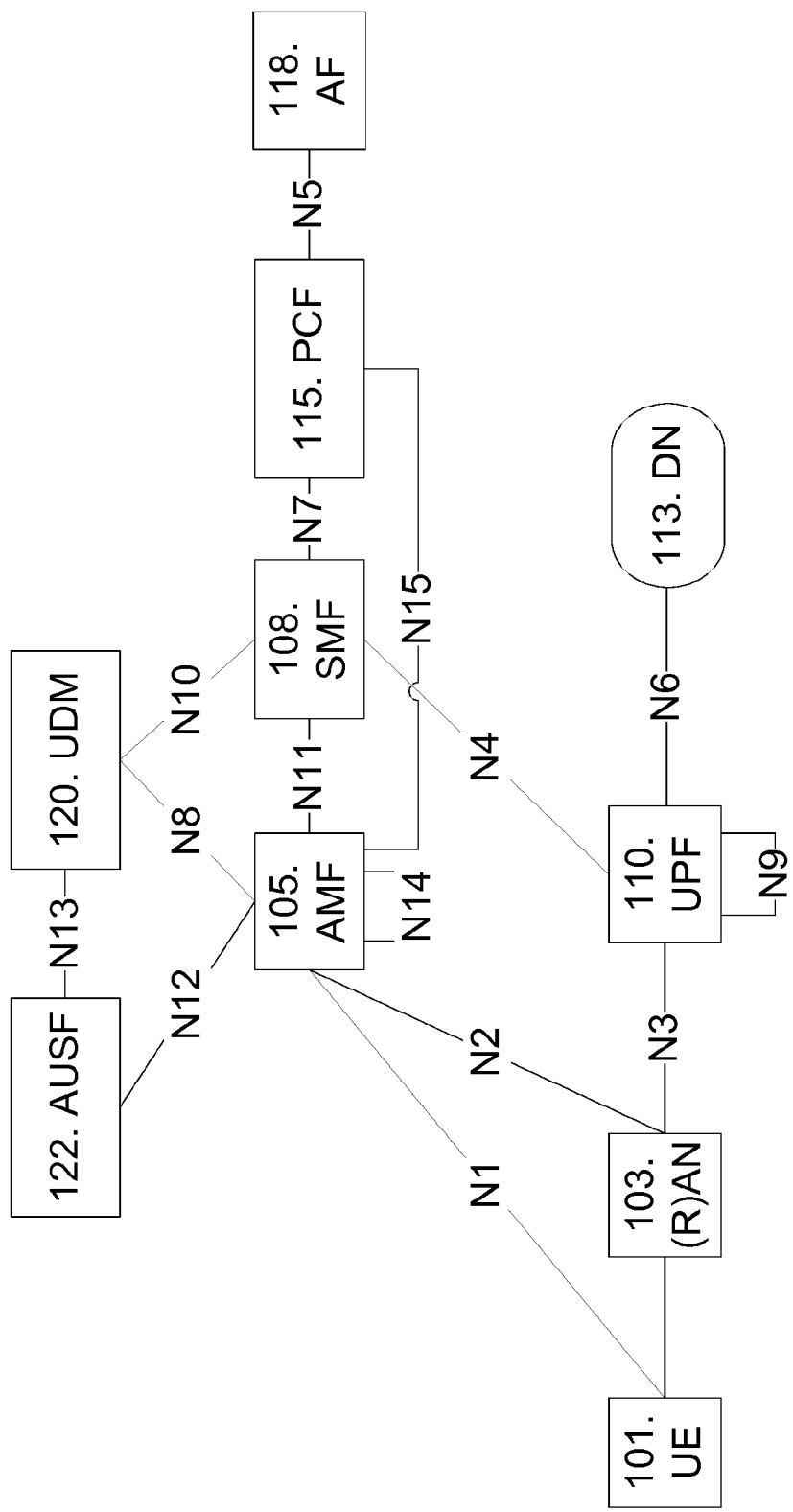
FIG. 1b is a schematic block diagram illustrating embodiments of a system.

FIG. 1b depicts a communication system 100 in which embodiments herein may be implemented. Compared to FIG. 1a, FIG. 1b illustrates an example system with more entities compared to FIG. 1a.

FIG. 1b illustrates the UE 101 which is the same UE as in FIG. 1a. The UE 101 is configured to be connected to a (R)AN 103. The UE 101 is configured to be connected, via a N1 interface to the AMF 105 (the AMF 105 and the (R)AN 103 are both examples of the first node in FIG. 1a). The (R)AN 103 is configured to be connected to, via a N2 interface, to the AMF 105. The (R)AN 103 is configured to be connected to, via a N3 interface, to an UPF 110. The N9 illustrated in FIG. 1b is a reference point between two Core UPFs. The UPF 110 is configured to be connected to a DN 113 via a N6 reference point. The terms reference point and interface are sometimes used interchangeably herein. The UPF 110 is also configured to be connected to a SMF 108 via a N4 interface. The SMF 108 in FIG. 1b is an example of a second node 108 in FIG. 1a. The AMF 105 and the SMF 108 are configured to be connected to each other via a N11 reference point. The reference point N14 illustrated in FIG. 1b is a reference point between two AMFs 105. The AMF 105 is configured to be connected to an AUSF 122 via the N12 interface and to the Unified Data Management (UDM) 120 via the N8 interface. The AUSF 122 and the UDM 120 are configured to be connected to each other over the N13 interface. The UDM 120 and the SMF 108 are configured to be connected to each other via the N10 interface. The AMF 105 is configured to be connected, via the N15 interface, to a Policy function (PCF) 115. The SMF 108 and the PCF 115 are configured to be connected to each other over the N7 interface. The PCF 115 is configured to be connected to an Application Function (AF) 118 via a N9 interface.

The prioritization of 4G parameters at establishing a 5G flow shall only impact the 4G parameters and not the 5G flow and its use in the 5G access. One advantage is that the prioritization of 4G resources would not impact the UE's service use while it remains served by the 5G access. At an access change to 4G, the 5G flows which are not provided 4G parameters are not made available to the 4G access, and the 5G flows which are provided with 4G parameters are the only ones used as input to the access change procedure.

The terms 5G flow and 5G QoS flow are used interchangeably herein. Similarly, the terms 4G flow and 4G QoS flow are used interchangeably herein.

There may be at least the following two ways to reduce the number of 5G QoS flows with 4G parameters:

Remove the 4G parameters from the 5G QoS flow that is being activated, or

Remove the 4G parameters of an already active 5G QoS flow to give room for adding 4G parameters to a 5G QoS flow that is being activated.

Both ways allow the 5G QoS flow to be activated and used in the 5GS regardless if there is a limitation in use of 4G parameters for use with 4G.

The rejection/pre-emption may be performed by the 5G core network, e.g. by the AMF 105. Alternative network locations to perform rejection/pre-emption may be:

The 5GS gNodeB 103 which serves the UE 101 with radio resources using a UE context The UE 101 itself which is aware of all QoS flows and 4G parameters as communicated via interface N1. N1 is the control signaling interface between the UE 101 and the 5GC.

The 4G parameter prioritization at the gNodeB 103 may be described as follows: In 5GS, it is an option to, just as in the 3GPP Third Generation (3G) access, to not always establish all user plane resources. User plane resources are PDU Sessions and associated QoS flows. If the gNodeB 103 does not always have access to all PDU sessions and QoS flows assigned to a UE 101, it is not possible for the gNodeB 103 to make prioritization over all UE resources. In addition, the gNodeB 103 is only provided with a UE context when the UE 101 is served by the gNodeB 103. This means that the gNodeB 103 is not immediately able to perform a prioritization on a QoS flow request issued by an SMF+PGW-C when the UE 101 is idle and there is no UE context in the gNodeB 103. To address that the 5GS would first have to perform paging and get the UE 101 connected, and as part of that processing, provide the gNodeB 03 with a UE context.

Figure 2:
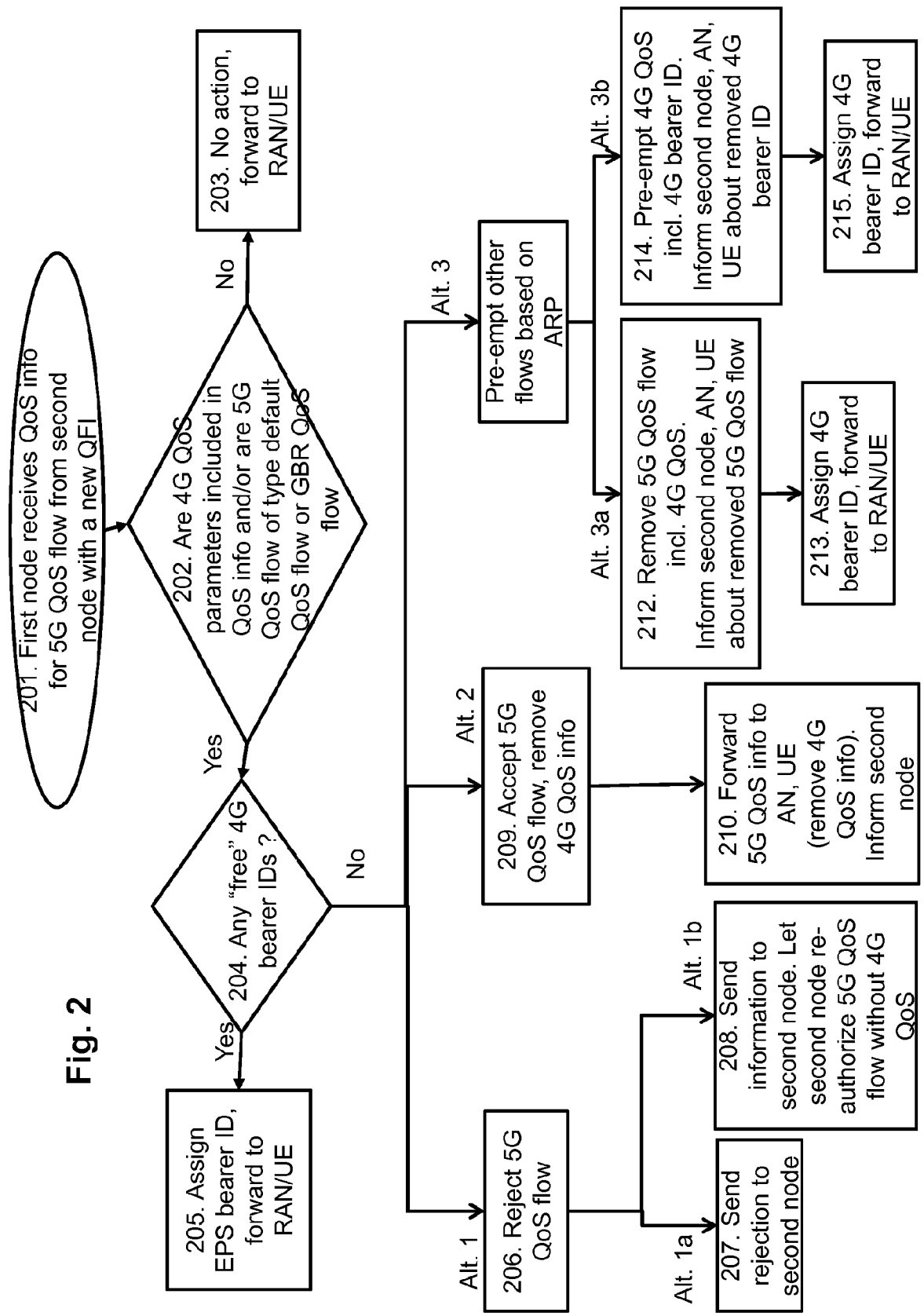
FIG. 2 is a flow chart illustrating embodiments of a method.

4G parameter prioritization at the UE may be described as follows: In 5GS, just as in 4GS, the UE 101 is not provided with the 4G prioritization information ARP. With no access to ARP the UE 101 is not able to prioritize 4G parameters. If prioritization would be performed by the UE 101, it would require the UE 101 to show a flawless behavior and in all UE implementations always create a correct result. What the history tells us is that there will always be some implementation error, and the issue is that it would be difficult to address by the 5GS network. It would require a correction to be applied to all UEs 101 with incorrect behavior and that is not realistic. In addition, the operator of a 5GS network may want to apply network specific prioritization rules taking additional information into account at making a decision. The UE 101 does not have access to such operator specific information if the UE should prioritize between 4G parameters. The AMF 105 may be more suitable than the UE 101 to prioritize 4G resources FIG. 2 is a flow chart illustrating an embodiment of a method performed by the first node 103, 105 at assigning and prioritizing 4G availability. The first node 103, 105 may be an AMF 105, a gNB 103, a UE 101 etc. The term 4G used in FIG. 2 may also be referred to as EPS. The method illustrated in FIG. 2 comprises at least one of the following steps, which steps may be performed in any suitable order than described below:

Step 201

The first node 103, 105 receives QoS information from the second node 108. The QoS comprises a new QFI. The QoS information may also be referred to as QoS parameters.

The QoS information may comprise at least one of the following:
- 4G QoS information
- 5G QoS information
- Priority information Step 202

The first node 103, 105 checks at least one of the following:
- Are there 4G QoS information included in the QoS information received in step 201? and/or
- Is the 5G QoS flow of the types default QoS flow or GBR QoS flow?

This check is performed in order to determine whether the first node 103, 105 should assign a 4G bearer ID (presumed that there are available 4G bearer IDs). So, the first node 103, 105 may assign a 4G bearer ID if the QoS information includes 4G QoS information and/or the 5G QoS is of type default QoS Flow or of type GBR QoS Flow.

For example, it may be only the 5G QoS type that determines whether a 4G QoS bearer should be assigned. In such example, the second node 108 may always assign an associated 4G QoS bearer ID. In another example, it may be the existence of the 4G QoS information that triggers the 4G bearer ID assignment.

The bearer assignment may be followed by actions such as reject and/or pre-empt, which will be described in more detail below.

Step 203

If the answer to both the questions in step 202 is no, then the first node 103, 105 does not perform any action and forwards information about this to at least one of the RAN 103 and UE 101. No action means that the first node 103, 105 uses native 5G signaling with no 4G QoS information included.

Step 204

If the answer to at least one of the questions in step 202 is yes, the first node 103, 105 checks whether there are any "free" 4G bearer IDs. The term free 4G bearer ID may also be referred to as an available 4G bearer ID, non-used 4G bearer ID, vacant 4G bearer ID etc.

The 4G bearer ID is used by UE 101 and may also be used by the RAN 103. But the 4G bearer ID is associated with the 4G QoS flow that in turn is associated with the 5G QOS flow. Thus, the 4G bearer ID is implicitly also associated with the 5G QoS flow.

Step 205

If the check in step 204 resulted in that there is at least one free 4G bearer ID, then the first node 103, 105 assigns an 4G bearer ID (also referred to as an 4G bearer ID) to be used for the 4G QoS flow, and forwards information about this to at least one of the RAN 103 and UE 101.

If the check in step 205 resulted in that there is no free 4G bearer ID, then at least one of the alternatives 1, 2 or 3 in FIG. 2 is performed. Alternative 1 comprises step 206, 207 and 207, and is divided into two sub-alternatives alt. 1a and alt 2b. Alternative 2 comprises steps 209 and 210. Alternative 3 comprises steps 211, 212, 213, 214 and 215, and is divided into two sub-alternatives alt. 3a (steps 212 and 213) and alt 3b (steps 214 and 215). Alt. 1b and 2 provides a first-come-first-served logic. Alt. 3b provides a prioritization of 4G resources for the UE 101.

Alternative 1—Step 206

This step belongs to alternative 1. The first node 103, 105 rejects the 5G QoS flow associated with the QoS information from step 201. Alternative 1 may continue in alternative 1a or alternative 1b.

Alternative 1a—Step 207

This step belongs to alternative 1a and is a sub-alternative of alternative 1. The first node 103, 105 sends a rejection to the second node 108. The rejection is a rejection of the 5G QoS flow associated with the QoS information in step 201.

Alternative 1b—Step 208

This step belongs to alternative 1b and is a sub-alternative of alternative 1, and performed instead of alternative 1a. The first node 103, 105 sends information to the second node 108 about the rejection in step 206, and lets the second node 108 reauthorize a 5G QoS flow without 4G QoS.

Alternative 2—Step 209

This step belongs to alt. 2. The first node 105 accepts the 5G QoS flow and removes the 4G QoS information from the QoS information. Thus, the QoS information only comprises 5G QoS information after step 209.

Alternative 2—Step 210

This step belongs to alt. 2. The step is performed after step 209. The first node 103, 105 forwards the 5G QoS information to at least one of the RAN 103 and the UE 101 without the 4G QoS information. The first node 103, 105 also informs the second node 108 about the accept and the removal.

Alternative 3

In alt. 3, the first node 103, 105 pre-empts other 4G QoS flows based on ARP. ARP is short for Allocation and retention priority and is an example of a priority parameter. The priority parameter may be comprised in the QoS information in step 201. Note that ARP is only an example of a priority parameter and that other suitable priority parameters can be used herein. The priority parameter may be for example an integer ranging from 1 to 15, with 1 being the highest level of priority and 15 is the lowest level of priority or no priority. A high level or priority may be associated with a GBR bearer and a low priority may be associated with a non-GBR bearer etc.

Here it could be that the first node 103, 105 may either compare the 5G QoS of a new vs. an already used, or the 4G QoS of a new vs. an already used, or receiving a separate QoS/priority indication from the second node 108 that only indicates the priority for 4G bearer ID assignment.

Alt. 3 may be executed as in alt. 3a or alt 3b described below.

Alternative 3a—Step 212

This step belongs to alternative 3a and is a sub-alternative of alternative 3. The first node 103, 105 removes the whole 5G QoS flow including the 4G QoS information. The first node 103, 105 informs at least one of the second node 108, AN 103 and UE 101 about the removed 5G QoS flow.

Alternative 3a—Step 213

This step belongs to alternative 3a and is a sub-alternative of alternative 3. Step 213 is performed after step 212. The first node 103, 105 assigns a 4G bearer ID and forwards information about this to at least one of the RAN 103 and the UE 101.

Alternative 3b—Step 214

This step belongs to alt. 3b and is a sub-alternative of alternative 3. Alt. 3b is an alternative to alt. 3a. The first node 103, 105 pre-empts the 4G QoS flow including the 4G bearer ID. The first node 103, 105 informs at least one of the second node 108, RAN 103 and the UE 101 about the removed 4G bearer ID.

Alternative 3b—Step 215

This step belongs to alt. 3b and is a sub-alternative of alternative 3. This step is performed after step 214. The first node 103, 105 assigns a 4G bearer ID and forwards information about this to at least one of the RAN 103 and UE 101.

In alternatives 1a and 3a, for a setup of a QoS flow in 5G, both the 5G QoS part including the 4G QoS part are rejected (alternative 1a) or pre-empted (alternative 3a) due to that there are no available 4G bearer IDs. In those alternatives, the 4G bearer ID is a 4G parameter which is not used in 5G except for mobility to 4G. This is different compared to the known procedure where a bearer setup is rejected due to no available 4G bearer IDs, alternatively to pre-empt an already assigned bearer to give space for a more prioritized bearer. In the known procedure, it is only the 4G QoS information that is removed due to the 4G limitation, i.e. no available 4G bearer IDs.

Figure 3:
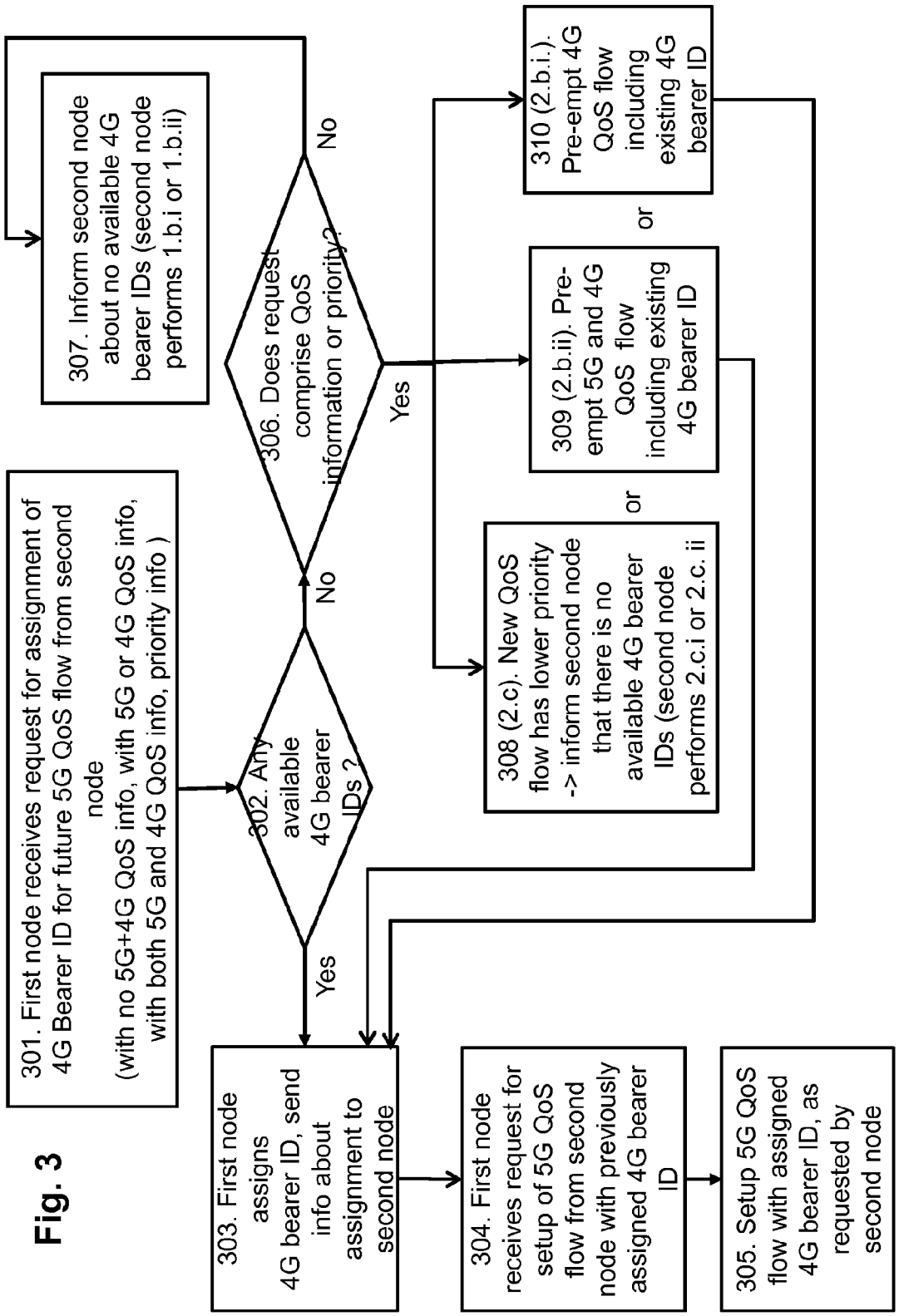
FIG. 3 is a flow chart illustrating embodiments of a method.

FIG. 3 is a flow chart illustrating an embodiment of a method. The method illustrated in FIG. 3 comprises at least one of the following steps, which steps may be performed in any suitable order than described below:

Step 301

The first node 103, 105 receives request for assignment of 4G bearer ID for a 5G QoS flow from second node 108. The 5G QoS flow may be referred to as a future 5G QoS flow. The request may comprise no 5G QoS information and 4G QoS information, or it may comprise at least one of the following 5G QoS information or 4G QoS information, both 5G QoS information and 4G QoS information, and/or priority information.

Step 302

The first node 103, 105 checks whether there are any available 4G bearer IDs.

Step 303

If there are available 4G bearer IDs, the first node 103, 105 assigns a 4G bearer ID and sends information about the assignment to the second node 108.

Step 304

The first node 103, 105 receives a request for setup of a 5G QoS flow from the second node 108 with the previously assigned 4G bearer ID, i.e. the 4G bearer ID assigned in step 303. The 5G QoS flow may be referred to as a new 5G QoS flow or a first 5G QoS flow.

Step 305

The first node 103, 105 sets up the 5G QoS flow with the assigned 4G bearer ID, as requested by second node 108 in step 304.

Step 306

If there are no available 4G bearer IDs, the first node 103, 105 checks whether the request in step 301 comprises QoS information or priority information. If there is no QoS information or priority information in the request, the method proceeds to step 307. If there is at least one of the QoS information or priority information in the request, the method performs any of the alternatives in step 308, 309 or 310.

Step 307

If the request in step 301 does not comprise QoS information or priority information, the first node 103, 105 informs the second node 108 about no available 4G bearer IDs. This step is described as step 1.b below. The second node 108 performs one of the alternatives 1.b.i or 1.b.ii as described below Alternative 1.b.i To not setup the 5G QoS flow, if mobility to 4G is a requirement, or Alternative 1.b.ii To setup a pure 5G QoS flow without any 4G QoS flow or 4G bearer ID.

Step 308

This step is described as alternative 2.c. later. This step is one alternative step to be performed if the request comprises QoS information and/or priority information, as checked in step 306. The first node 103, 105 checks whether the QoS flow to be setup has lower priority. If it has lower priority, the first node 103, 105 informs the second node 108 that there is no available 4G bearer IDs. The second node 108 then performs any of the alternatives described as 2.c.i or 2.c. ii below;

Alternative 2.c.i Not setup the 5G QoS flow (if mobility to 4G is a requirement), or Alternative 2.c.ii Setup a pure 5G QoS flow without any 4G QoS flow or 4G bearer ID.

Step 309

This step is described as alternative 2.b.ii later. This step corresponds to step 212 in FIG. 2. This step is one alternative step to be performed if the request comprises QoS information and/or priority information, as checked in step 306. The first node 103, 105 pre-empts the 5G QoS flow and the 4G QoS flow including the existing 4G bearer ID. If the alternative in step 309 is performed, then the method continues to step 303.

Step 310

This step is described as alternative 2.b.i later. This step corresponds to step 214 in FIG. 2. This step is one alternative step to be performed if the request comprises QoS information and/or priority, as checked in step 306. The first node 103, 105 pre-empts the 4G QoS flow including the existing 4G bearer ID. If the alternative in step 310 is performed, then the method continues to step 303.

In some embodiments, the second node 108 may request an assignment of a 4G bearer ID from the first node 103, 105 with or without sending QoS information to the first node 103, 105. After accept by the first node 103, 105, a setup of a 5G QoS flow including the 4G QoS flow and the 4G bearer ID assigned by the first node 103, 105. The difference is that it is a request for a 4G bearer ID for a future or upcoming 5G QoS flow. In some of the embodiments described herein, the first node 103, 105 acts upon a request for setting up a flow. This embodiment for assignment of a 4G bearer ID can be described as follows:

1. If the second 108 does not send the 5G QoS information or the 4G QoS information in the request for the 4G bearer ID, the first node 103, 105 can then:

1.a The first node 103, 105 may respond by assigning a free 4G bearer ID to the second node 108. Then, the second node 108 may request a setup of a 5G QoS flow including the 4G QoS information and the 4G bearer ID assigned by the first node 103, 105.

OR 1.b This corresponds to step 307 in FIG. 3. The first node 103, 105 can reply to the second node 108 that there are no available 4G bearer IDs. Then the second node 108 can select between:

1.b.i To not setup the 5G QoS flow, if mobility to 4G is a requirement, or 1.b.ii To setup a pure 5G QoS flow without the 4G QoS information or the 4G bearer ID.

2. If the second node 108 sends 5G QoS information and/or 4G QoS information or a priority parameter to indicate the importance of the assignment of the 4G bearer ID for the future flow, then the first node 103, 105 can:

2.a The first node 103, 105 can respond by assigning an available 4G bearer ID to the second node 108. Then the second node 108 may request a setup of the 5G QoS flow including the 4G QoS information and the 4G bearer ID assigned by the first node 103, 105.

OR 2.b With assistance from the QoS information sent from the second node 108, the first node 103, 105 may realize that the new 5G QoS flow has higher priority and then pre-empt the existing flow (2.b.i. or 2.b.ii below). Then, the first node 103, 105 responds to the second node 108 by assigning an available 4G bearer ID. The second node 108 requests a setup of a 5G QoS flow including the 4G QoS information and the 4G bearer ID assigned by the first node 103, 105:

2.b.i This corresponds to step 310 in FIG. 3. Pre-empting the 4G QoS information including the already assigned 4G bearer ID—towards at least one of the UE 101, gNB/RAN 103, second node 108—to make room for the new 5G QoS flow, i.e. to be able to assign a 4G bearer ID to it. This corresponds to alternative 3b in FIG. 2.

2.b.ii This corresponds to step 309 in FIG. 3. Pre-empting the 5G QoS information and 4G QoS information including the already assigned 4G bearer ID—towards at least one of the UE 101, gNB/RAN 103, second node 108—to make room for the new 5G QoS flow to be able to assign a 4G bearer ID to it. This corresponds to alternative 3a in FIG. 2.

2.c This corresponds to step 308 in FIG. 3. With assistance from the QoS information sent from the second node 108, the first node 103, 105 may realize that the new 5G QoS flow has lowest priority and can therefore respond that there are no available 4G bearer IDs. This corresponds to alternative 1b in FIG. 2. The second node 108 can then select to:

2.c.i Not setup the 5G QoS flow, if mobility to 4G is a requirement, OR 2.c.ii Setup a pure 5G QoS flow without 4G QoS information or 4G bearer ID.

FIGS. 4-10 will now be described and contain decision logic in the first node 103, 105 and signaling sequences for the rejection and pre-emption. The signaling flows are based on current 3GPP Rel-15 premises of a 5GC architecture with MM-SM separation between the functional blocks AMF 105 and SMF 108. In FIGS. 4-10, the first node 103, 105 is exemplified with an AMF 105 and the second node 108 is exemplified with a SMF 108.

Figure 4:
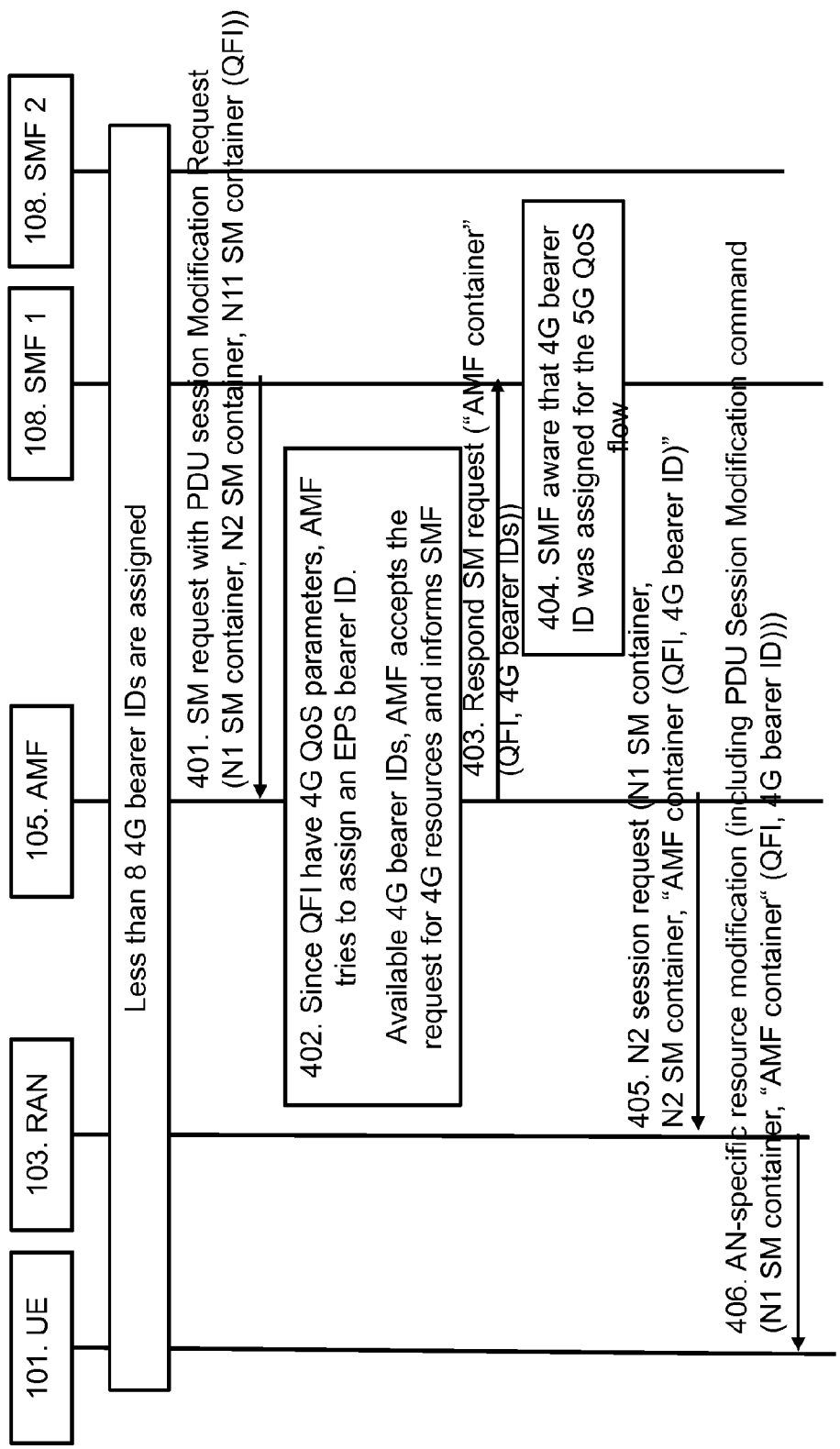
FIG. 4 is a signaling diagram illustrating embodiments of alternative 1 from FIG. 2.

FIG. 4 is a signaling diagram illustrating alternative 1 in FIG. 2 for when there are available 4G bearer IDs, i.e. there is less than 8 already assigned 4G bearer IDs. FIG. 4 shows two SMFs 108, SMF 1 and SMF 2. Both are referred to using the reference number 108. The method illustrated in FIG. 4 comprises at least one of the following steps, which steps may be performed in any suitable order than described below:

Step 401

The SMF 1 108 sends a SM request to modify the PDU Session to the AMF 105. The SM request comprises at least one of the following parameters: N1 SM container, N2 SM container, N11 SM container. The SMF container comprises a QFI. The AMF 105 receives the S-M request from the SMF 1 108.

Step 402

Since the QFI comprised in the SM request have 4G QoS information, the AMF 105 tries to assign a 4G bearer ID. As mentioned above, there are available 4G bearer IDs. The AMF 105 accepts the request for 4G resources and informs SMF 1 108 about the accept.

Step 403

The AMF 105 sends a response to the SM request to the SMF 1 108. The response comprises an AMF container which comprises at least one of the following parameters: QFI, 4G bearer IDs.

Step 404

The SMF 105 is aware that a 4G bearer ID was assigned for the 5G QoS flow.

Step 405

The AMF 105 sends a N2 session request to the RAN 103. The request comprises at least one of the following information containers: N1 SM container, N2 SM container, and AMF container. The AMF container comprises at least one of the following parameters: QFI, 4G bearer ID. The RAN 103 receives the request from the AMR 105.

Step 406

The RAN 103 sends an AN-specific resource modification message to the UE 101. The message includes a PDU Session Modification command which comprises at least one of the following containers: an N1 SM container and an AMF container. The AMF container comprises at least one of the following parameters: QFI and 4G bearer ID.

Figure 5:
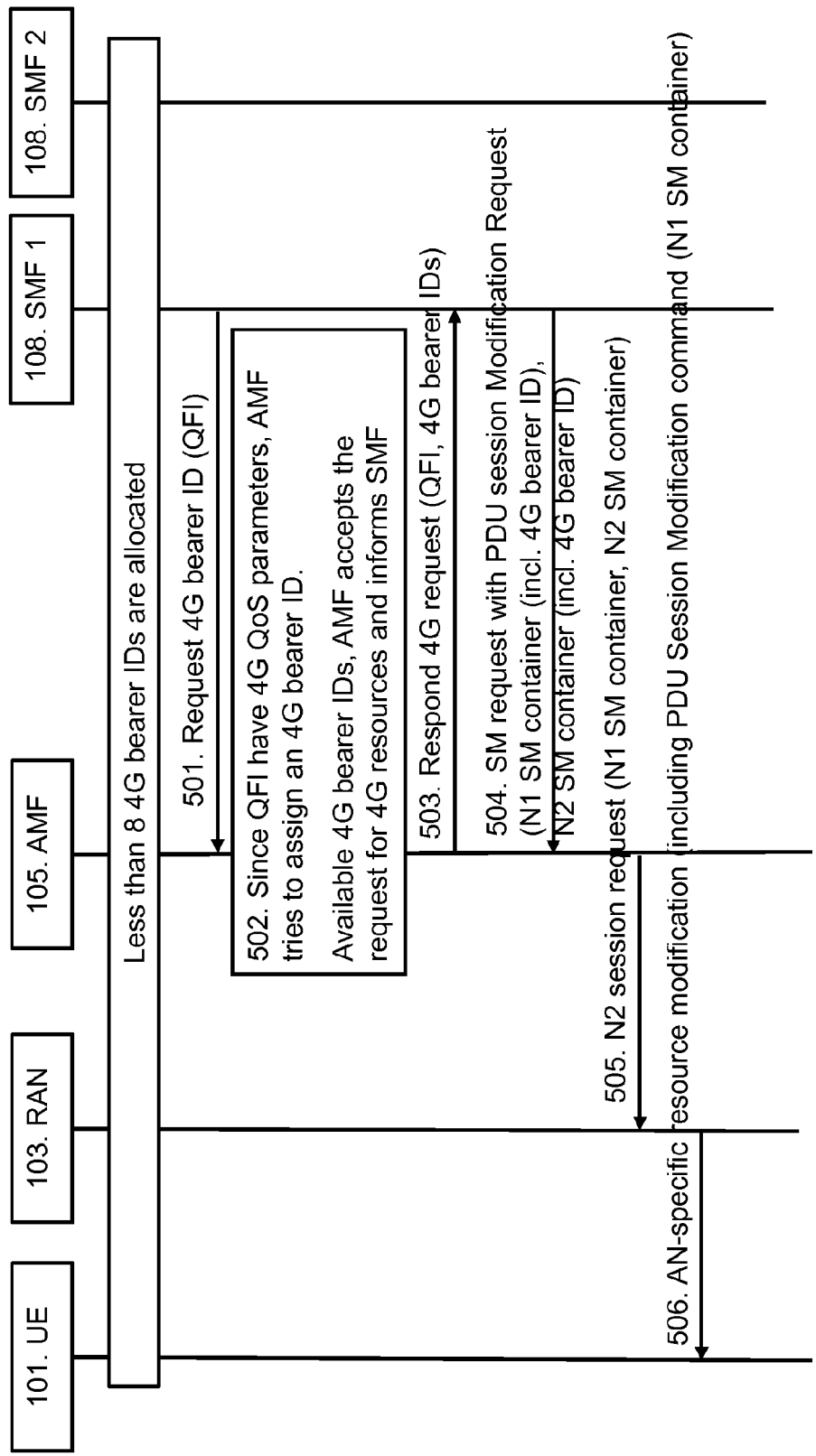
FIG. 5 is a signaling diagram illustrating embodiments of alternative 2 from FIG. 2

FIG. 5 is a signaling diagram illustrating alternative 2 in FIG. 2 for when there are available 4G bearer IDs, i.e. there is less than 8 already allocated 4G bearer IDs. FIG. 5 shows two SMFs 108, SMF 1 and SMF 2. Both are referred to using the reference number 108. The method illustrated in FIG. 5 comprises at least one of the following steps, which steps may be performed in any suitable order than described below:

Step 501

The SMF 1 108 sends a Request for a 4G bearer ID comprising a QFI to the AMF 105.

Step 502

Since the QFI have 4G QoS information, the AMF 105 tries to assign a 4G bearer ID. Available 4G bearer IDs, AMF accepts the request for 4G resources and informs the SMF 1 108 about the accept.

Step 503

The AMF 105 sends a response to the 4G bearer ID request. The response comprises at least one of the following parameters: QFI, 4G bearer IDs.

Step 504

The SMF 108 sends a SM request with a PDU session Modification Request to the AMF 105. The request comprises at least one of the following: N1 SM container (incl 4G bearer ID), N2 SM container (incl 4G bearer ID).

Step 505

The AMF 105 sends a N2 session request to the RAN 103. The request comprises at least one of the following: N1 SM container, N2 SM container.

Step 506

The RAN 103 sends an AN-specific resource modification message to the UE 01. The message includes a PDU Session Modification command with a N1 SM container.

Figure 6:
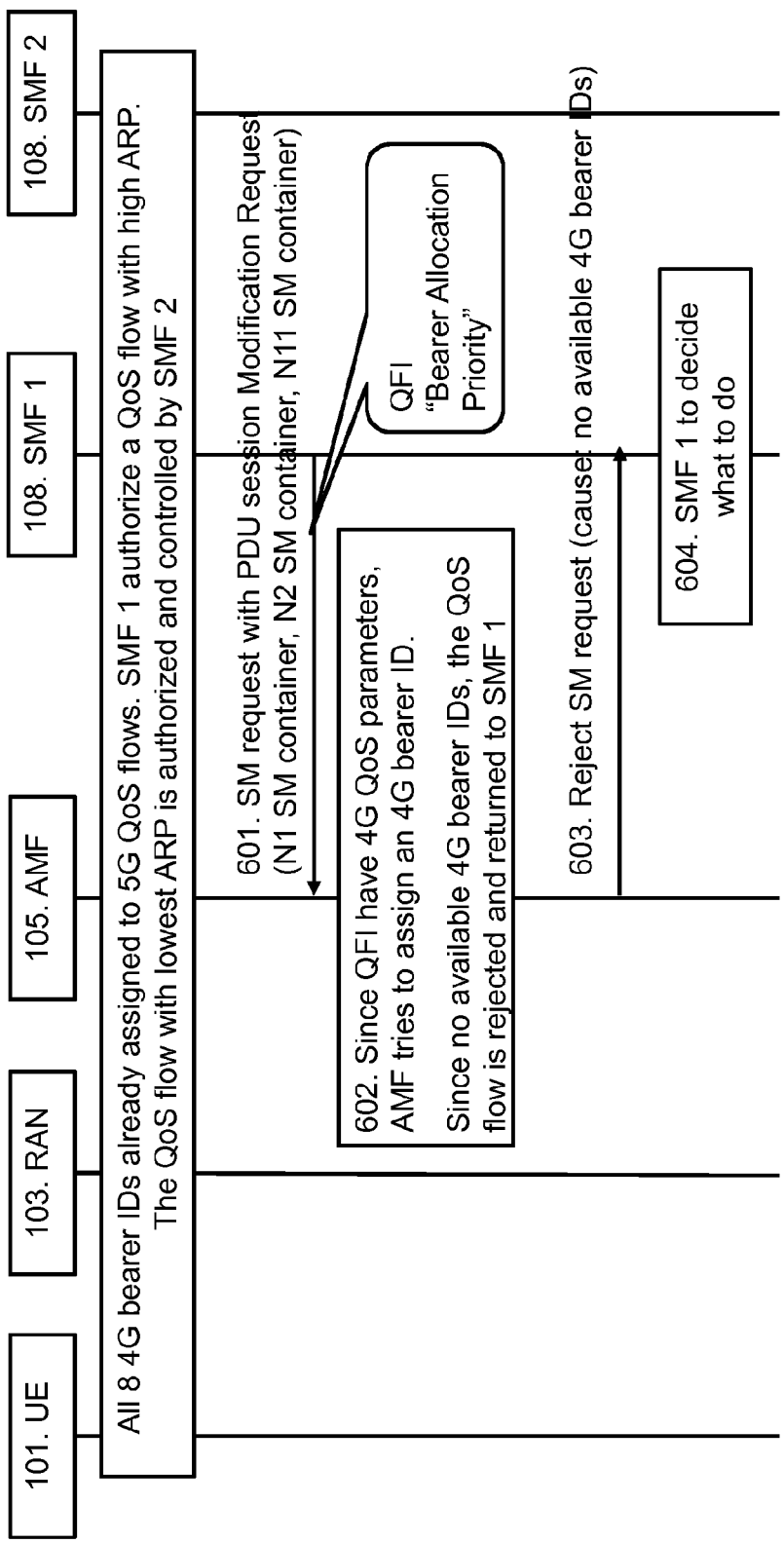
FIG. 6 is a signaling diagram illustrating embodiments of alternative 1a from FIG. 2.

FIG. 6 is a signaling diagram illustrating alternative 1a in FIG. 2 for rejecting QOS flow for when there are no available 4G bearer IDs, i.e. there is 8 already assigned 4G bearer IDs. FIG. 6 shows two SMFs 108, SMF 1 and SMF 2. Both are referred to using the reference number 108. All 8 4G bearer IDs are already assigned to 5G QoS flows. The SMF 1 108 authorizes a 5G QoS flow with high ARP. The 5G QoS flow with lowest ARP is authorized and controlled by the SMF 2 108. The method illustrated in FIG. 6 comprises at least one of the following steps, which steps may be performed in any suitable order than described below:

Step 601

The SMF 1 108 sends a SM request with PDU session Modification Request to the AMF 105. The request comprises at least one of the following parameters: N1 SM container, N2 SM container, N11 SM container. The N11 SM container comprises at least one of the following: QFI and "bearer Allocation Priority". The AMF 105 receives the request from the SMF 1 108.

Here it could be that the first node 103, 105 may either compare the 5G QoS information of a new 5G QoS flow vs. an already used 5G QoS flow, or compare the 4G QoS information of a new 5G QoS flow vs. an already used 5G QoS flow, or receiving a separate QoS information or priority indication from the second node 108 that only indicates the priority for 4G bearer ID assignment.

Step 602

Since the QFI have 4G QoS information, the AMF 105 tries to assign a 4G bearer ID. Since there are no available 4G bearer IDs, the 5G QoS flow is rejected and returned to SMF 1 108.

Step 603

The AMF 105 sends a Reject message to the SMF 1 108. The reject message is a reject of the SM request. The reject may comprise a cause of the reject, e.g. no available 4G bearer IDs. The SMF 108 receives the reject message from the AMF 105.

Step 604

The SMF 108 decides what to do when it has received the reject message in step 603.

Figure 7:
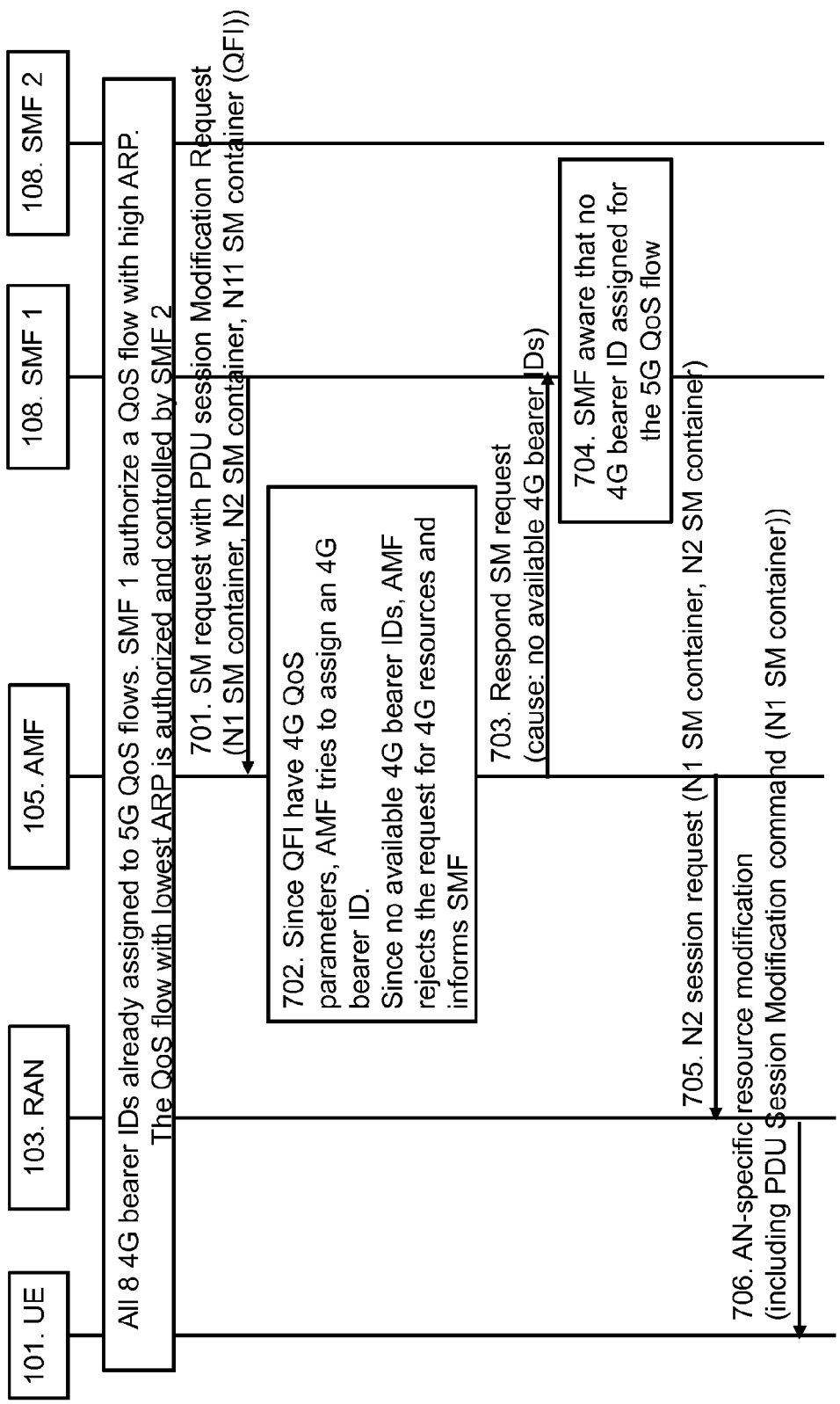
FIG. 7 is a signaling diagram illustrating embodiments of alternative 1b from FIG. 2.

FIG. 7 is a signaling diagram illustrating alternative 1b in FIG. 2 for rejecting a QoS flow when there are no available 4G bearer IDs, i.e. there is 8 already assigned 4G bearer IDs. FIG. 7 shows two SMFs 108, SMF 1 and SMF 2. Both are referred to using the reference number 108. All 8 4G bearer IDs are already assigned to 5G QoS flows. The SMF 1 108 authorizes a QoS flow with high ARP. The 5G QoS flow with lowest ARP is authorized and controlled by the SMF 2 108. The method illustrated in FIG. 7 comprises at least one of the following steps, which steps may be performed in any suitable order than described below:

Step 701

The SMF 1 108 sends a SM request with PDU session Modification Request to the AMF 105. The request comprises at least one of the following parameters: N1 SM container, N2 SM container, N11 SM container (QFI). The AMF 105 receives the request from the SMF 1 108.

Step 702

Since the QFI have 4G QoS information, the AMF 105 tries to assign a 4G bearer ID. Since there are no available 4G bearer IDs, the AMF 105 rejects the request for 4G resources and informs the SMF about the rejection and unavailability of 4G bearer IDs.

Step 703

The AMF 105 sends a response message to the SMF 1 108. The response message is a response to the SM request in step 701. The response may provide cause information for the rejection, i.e. no available 4G bearer IDs.

Step 704

Upon reception of the response in step 703, the SMF 1 108 becomes aware that no 4G bearer ID was assigned for the 5G QoS flow.

Step 705

The AMF 105 sends a N2 session request message to the RAN 103. The message comprises at least one of the following parameters: N1 SM container, N2 SM container. The RAN 103 receives the message from the AMF 105.

Step 706

The RAN 103 sends an AN-specific resource modification message to the UE 101. The message includes a PDU Session Modification command with an N1 SM container. The UE 101 receives the message from the RAN 103.

Figure 8:
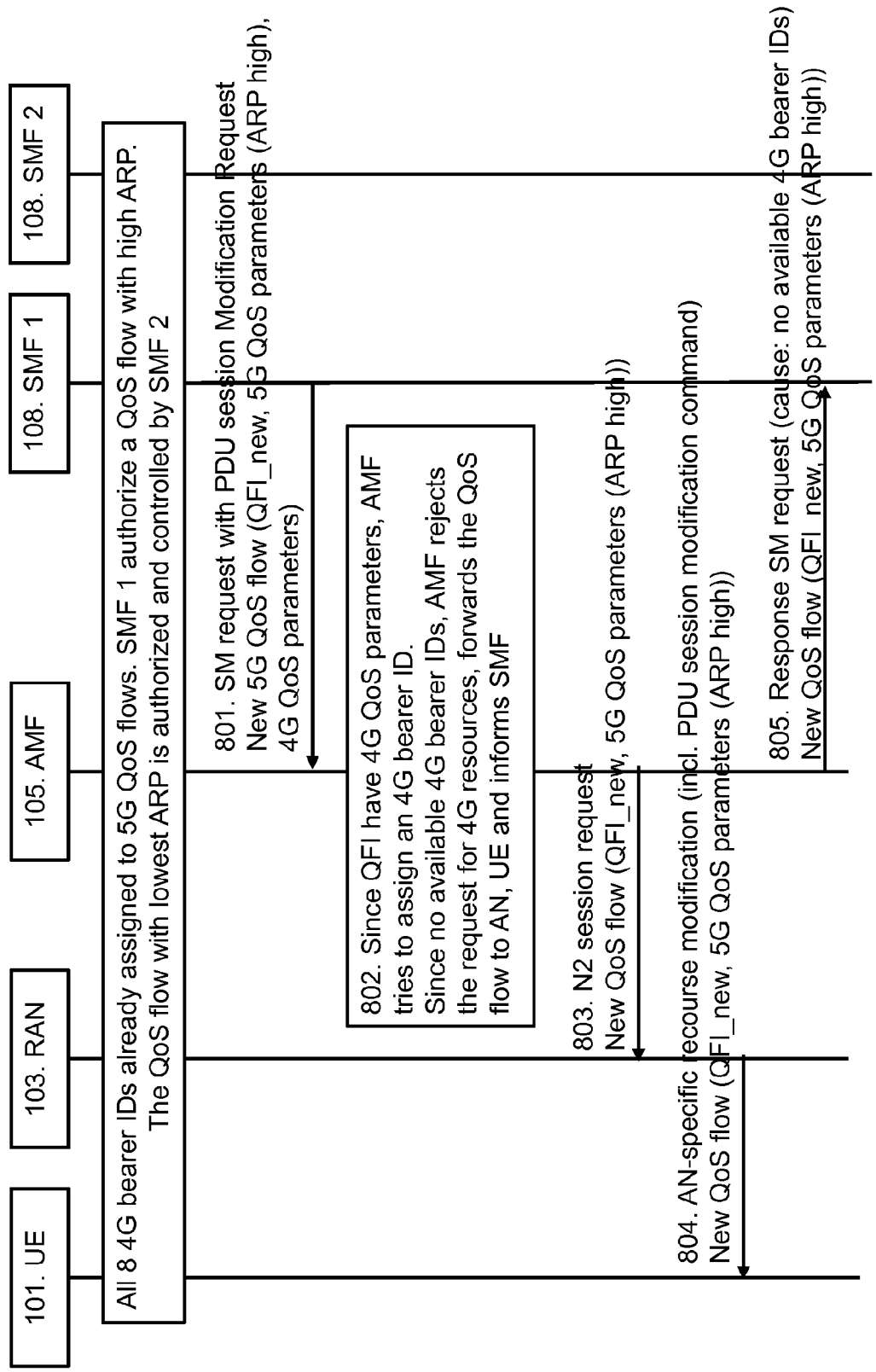
FIG. 8 is a signaling diagram illustrating embodiments of alternative 2 from FIG. 2

FIG. 8 is a signaling diagram illustrating alternative 2 in FIG. 2 for when there are no available 4G bearer IDs, i.e. there is 8 already assigned 4G bearer IDs. Furthermore, the 5G QoS flow is accepted and the 4G QoS information is removed from the QoS information. All 8 4G bearer IDs are already assigned to 5G QoS flows. FIG. 8 shows two SMFs 108, SMF 1 and SMF 2. Both are referred to using the reference number 108. The SMF 1 108 authorizes a 5G QoS flow with high ARP. The 5G QoS flow with lowest ARP is authorized and controlled by the SMF 2 108. The method illustrated in FIG. 8 comprises at least one of the following steps, which steps may be performed in any suitable order than described below:

Step 801

The SMF 1 108 sends a SM request with PDU session Modification Request to the AMF 105. The request is for a new 5G QoS flow. The request comprises at least one of the following parameters: QFI_new, 5G QoS information (ARP high) and 4G QoS information.

Step 802

Since the QFI received in step 810 have 4G QoS information, the AMF 105 tries to assign a 4G bearer ID. Since there are no available 4G bearer IDs, the AMF 105 rejects the request for 4G resources and forwards the 5G QoS flow to at least one of the following entities: RAN 103 and UE 101. The AMF 105 may also inform the SMF 1 108 about the rejection.

Step 803

The AMF 105 sends a N2 session request for a new 5G QoS flow to the RAN 103. The request comprises at least one of the following parameters: QFI_new and 5G QoS information (ARP high). The RAN 103 receives the request from the AMF 105.

Step 804

The RAN 103 sends an AN-specific resource modification message including a PDU session modification command for the new 5G QoS flow to the UE 101. The message comprises at least one of the following parameters: QFI_new and 5G QoS information (ARP high).

Step 805

The AMF 105 sends a Response message to the SMF 108, i.e. a response to the SM request in step 801. The response may comprise a cause for the rejection, i.e. no available 4G bearer IDs. The message comprises information about the new 5G QoS flow which may be at least one of the following parameters: QFI_new, 5G QoS information (ARP high).

Figure 9:
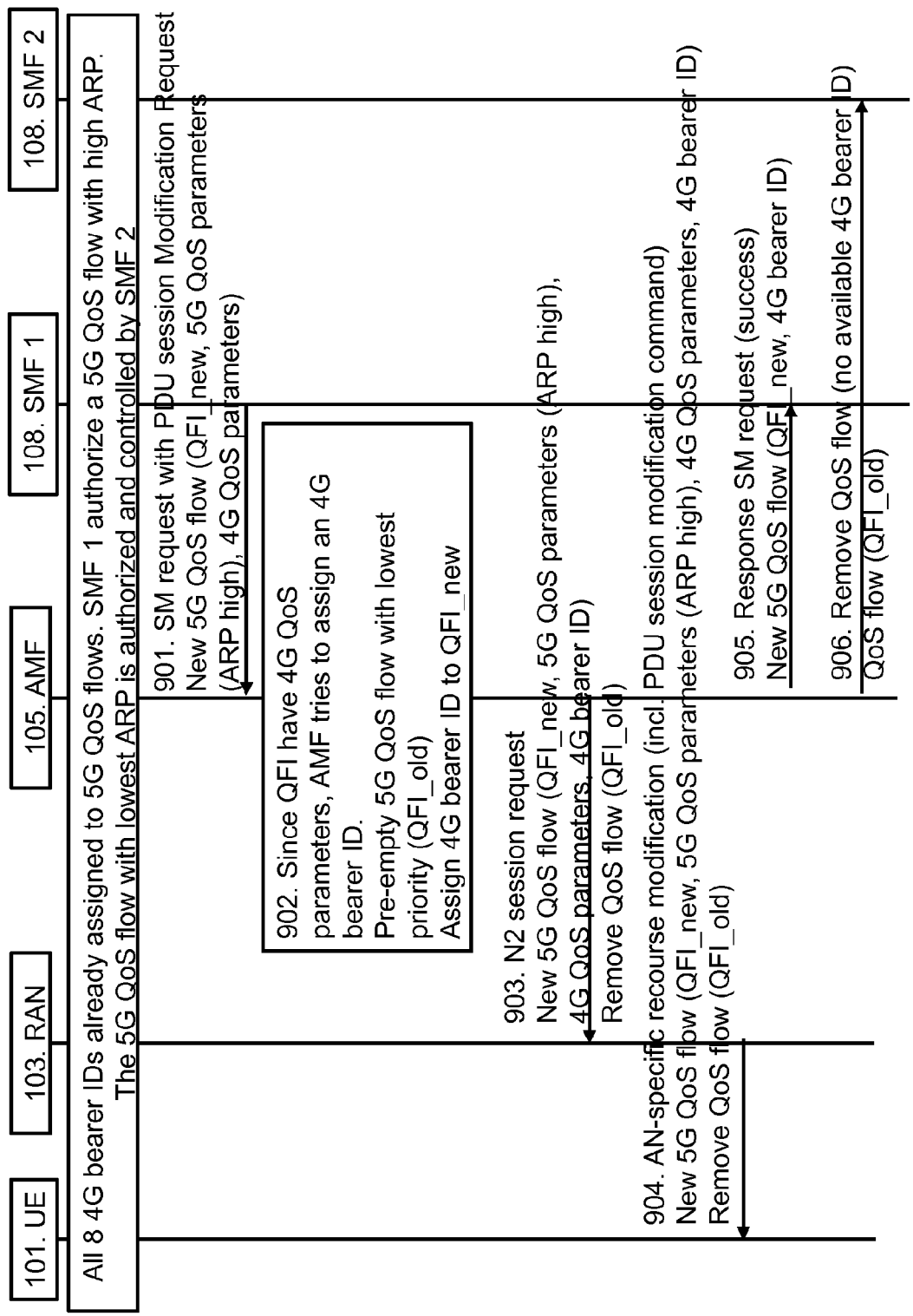
FIG. 9 is a signaling diagram illustrating embodiments of alternative 3a from FIG. 2.

FIG. 9 is a signaling diagram illustrating alternative 3a in FIG. 2 for when there are no available 4G bearer IDs, i.e. there are 8 already assigned 4G bearer IDs. Furthermore, other flows are pre-empted. All 8 4G bearer IDs are already assigned to 5G QoS flows. FIG. 9 shows two SMFs 108, SMF 1 and SMF 2. Both are referred to using the reference number 108. The SMF 1 108 authorizes a 5G QoS flow with high ARP. The 5G QoS flow with lowest ARP is authorized and controlled by the SMF 2 108. The method illustrated in FIG. 9 comprises at least one of the following steps, which steps may be performed in any suitable order than described below:

Step 901

The SMF 1 108 sends a SM request message with PDU session Modification Request to the AMF 105. The message comprises information about a new QoS flow. e.g. a new 5G QoS flow. The message comprises at least one of the following parameters: QFI_new, 5G QoS information (ARP high) and 4G QoS information.

Step 902

Since the QFI received in step 901 have 4G QoS information, the AMF 105 tries to assign a 4G bearer ID. As mentioned above, all 8 4G bearer IDs are already assigned to 5G QoS flows, so there are no available IDs for the new 5G QoS flow. The AMF 105 therefore pre-empts the existing 5G QoS flow with lowest priority (QFI_old). The AMF 105 assigns a 4G bearer ID to the QFI_new since one of the 8 available 4G bearer IDs have been pre-empted, i.e. made available.

The AMF 105 comprises priority information for the already assigned 4G bearer IDs and is therefore able to find the 4G bearer ID with lowest priority compared to the others. The priority information may instead be received from the SMF 1 108.

Here it could be that the first node 103, 105 may either compare the 5G QoS priority of a new QoS flow vs already used QoS Flow, or compare the priority for 4G QoS of a new vs already used QoS flow, or receiving a separate QoS/priority indication from the second node 108 that only indicate the priority for 4G bearer ID assignment.

Step 903

The AMF 105 sends a N2 session request for a new 5G QoS flow to the RAN 103. The request comprises at least one of the following parameters: QFI_new, 5G QoS information (ARP high), 4G QoS information and the 4G bearer ID which was assigned in step 902. The AMF 105 may also remove a QoS flow associated with QFI_old. The RAN 103 receives the request from the AMF 105.

Step 904

The RAN 103 sends an AN-specific resource modification message including a PDU session modification command to the UE 101. The message is for the new 5G QoS flow and comprises at least one of the following parameters: QFI_new, 5G QoS information (ARP high), 4G QoS information and the already assigned 4G bearer ID. The RAN 103 may also remove the remove QoS flow for the QFI_old or send information regarding the removal to the UE 101.

Step 905

The AMF 105 sends a response message to the SMF 1 108. The response is a response to the SM request and indicates that the request was successful. The response may comprise the QoS flow and at least one of the following parameters: QFI_new, 4G bearer ID.

Step 906

The AMF 105 sends instructions to the SMF 2 108 to remove the QoS flow since there are no available 4G bearer ID for the QoS flow associated with QFI_old. The SMF 2 108 receives the instructions from the AMF 105.

Figure 10:
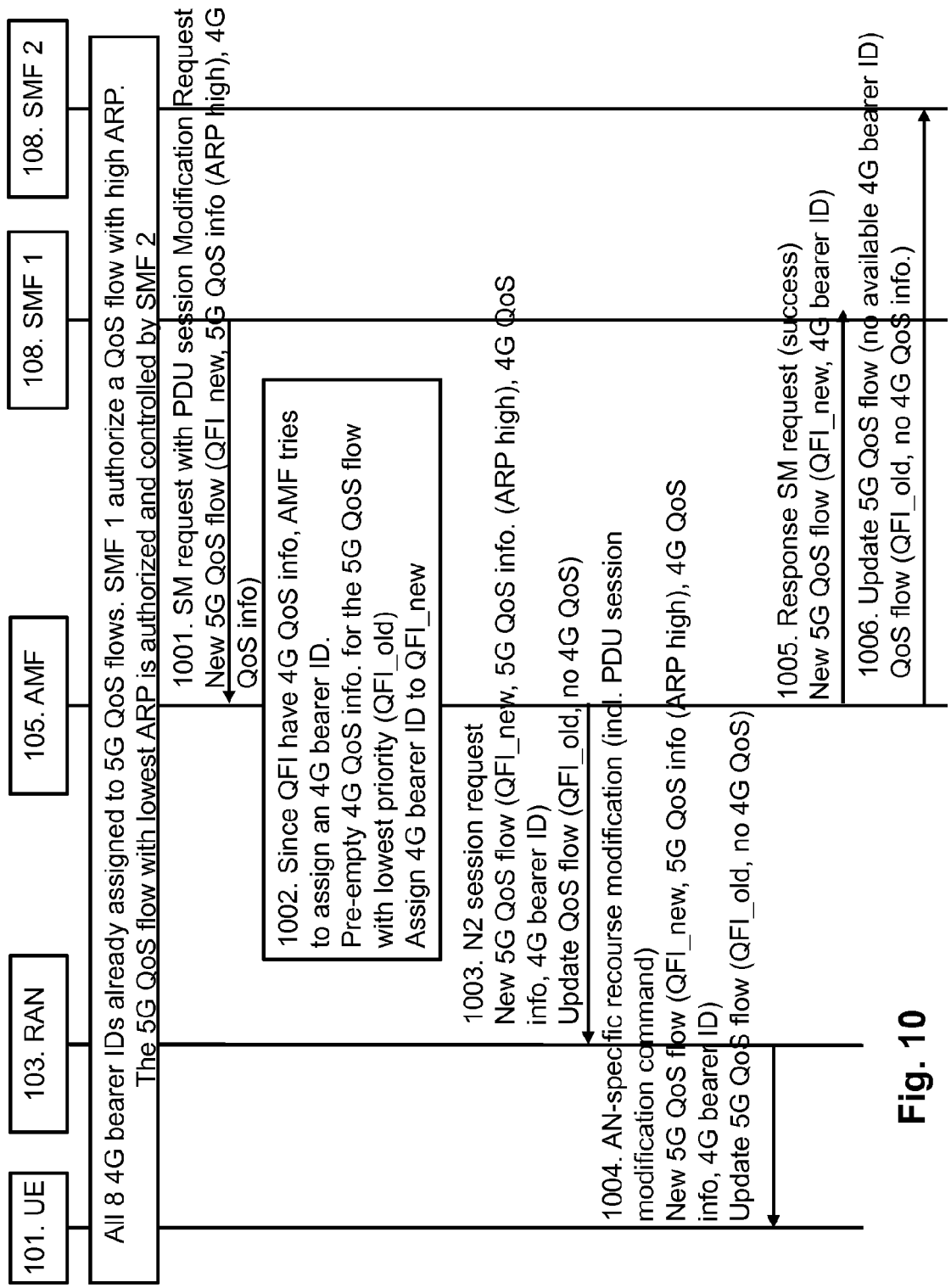
FIG. 10 is a signaling diagram illustrating embodiments of alternative 3b from FIG. 2.

FIG. 10 is a signaling diagram illustrating alternative 3b in FIG. 2 for when there are no available 4G bearer IDs, i.e. there is 8 already assigned 4G bearer IDs. Furthermore, other flows are pre-empted. All 8 4G bearer IDs are already assigned to 5G QoS flows. FIG. 10 shows two SMFs 108, SMF 1 and SMF 2. Both are referred to using the reference number 108. The SMF 1 108 authorizes a 5G QoS flow with high ARP. The 5G QoS flow with lowest ARP is authorized and controlled by the SMF 2 108. The method illustrated in FIG. 10 comprises at least one of the following steps, which steps may be performed in any suitable order than described below:

Step 1001

The SMF 1 108 sends a SM request with a PDU session Modification Request for the New 5G QoS flow to the AMF 105. The request comprises at least one of the following parameters: QFI_new, 5G QoS information (ARP high) and 4G QoS information.

Step 1002

Since the QFI from step 1001 have 4G QoS information, the AMF 105 tries to assign n 4G bearer ID. However, there are no available 4G bearer IDs. Therefore, the AMF 105 pre-empties a 4G QoS information for the 5G QoS flow with lowest priority (QFI_old) and assigns a 4G bearer ID to the QFI_new.

Here it could be that the first node 103, 105 may either compare 5G QoS priority of a new vs already used 5G QoS flow, or 4G QoS priority of new vs already used 5G QoS flow, or receiving a separate QoS/priority indication from the second node 108 that only indicate the priority for 4G bearer ID assignment.

Step 1003

The AMF 105 sends a N2 session request for the new 5G QoS flow to the RAN 103. The request comprises at least one of the following parameters: QFI_new, 5G QoS information (ARP high), 4G QoS information, the 4G bearer ID which was assigned in step 1002. The AMF 105 also sends an update 5G QoS flow with at least one of the following information QFI_old and no 4G QoS information to the RAN 103.

Step 1004

The RAN 103 sends an AN-specific resource modification message including a PDU session modification command to the UE 101. The message is for the new 5G QoS flow and comprises at least one of the following information: QFI_new, 5G QoS information (ARP high), 4G QoS information and 4G bearer ID. The RAN 103 also sends an update QoS flow with at least one of the following information QFI_old and no 4G QoS information to the UE 101.

Step 1005

The AMF 105 sends a response to the SMF 1 108 to inform the SMF 1 108 that the SM request was successful. The response is for the new 5G QoS flow and comprises at least one of the following information: QFI_new and 4G bearer ID. The SMF 1 108 receives the response from the AMF 105.

Step 1006

The AMF 106 sends an update QoS flow message to the SMF 2 108 informing it that there are no available 4G bearer ID. The AMF 105 also informs the SMF 2 108 about the QoS flow and sends at least one of the following information to the SMF 2 108: QFI_old and no 4G QoS.

In 3GPP TS 23.502 it is stated that "During PDU session establishment and GBR QoS flow establishment, EPS QoS mappings and EPS Bearer IDs are allocated such that non-GBR flows map to default EPS bearer (which is allocated an EPS bearer ID) and EPS Bearer IDs are allocated for the GBR flows that are mapped to dedicated bearers in EPC." The mapped 4G QoS context is prepared ahead of any 5GC to 4GC connected or Idle-mode mobility.

The 4G QoS information is a part of the SM context for the UE 101, and the 4G QoS information shall therefore be decided by the SMF and provided to the network. The SMF 108 shall provide the 4G QoS information for the default and the GBR 5G QoS flows. The SMF 108 may provide mapped 4G QoS information for default and GBR QoS flows.

There may be several alternatives regarding which network function that are responsible for the assignment of 4G bearer ID. As only 8 4G bearer IDs per UE 101 are allowed in 4G, the 5GS needs to ensure that this number is not exceeded when assigning the 4G bearer IDs in 5GS. The consequence of this is that the 4G bearer assignment should be done in a network function that is aware of all PDU sessions for a UE 101, and that is either the UE 101, the (R)AN 103 or the AMF 105.

Also, due to the limited number of 4G bearer IDs, it is important to discuss both the successful 4G bearer ID assignment and the scenario where the number of available 4G bearer IDs have already been assigned for other 5G QoS flows.

Independent of where the 4G bearer ID is assigned in the network, the SMF 108 and UE 100 need to have the same information about which 4G bearer ID that have been assigned for the 5G QoS flow. The (R)AN 103 may also need this information.

As the 4G only allows 8 4G bearers, the 5GS should not assign 4G bearer IDs after 8 have been assigned. The agreement that only the default 5G QoS flow and the GBR 5G QoS flows shall have associated 4G bearer IDs will limit the risk of reaching this limit for one UE 101, but the network behavior if this happens needs to be specified, and the solution for handling un-successful 4G bearer assignment should be taken into consideration when selecting which network function that shall handle the 4G bearer assignment functionality.

Three possible actions that the network might take if the number of allowed 4G bearer IDs are reached:
1) Reject the 5G QoS flow
2) Allow the 5G QoS flow, but do not assign a 4G bearer ID.
3) Allow the 5G QoS flow, withdraw a previous assigned 4G bearer ID if the flow have higher priority than other 5G QoS flows that have an associated 4G bearer ID.

If the 5G QoS flow is rejected and not authorized because the 4G bearer ID cannot be assigned, the 5G QoS flows might be rejected even for UEs 101 that will not move into 4G, but stay in 5G for the entire session.

A 5G QoS flow may not be reject because it is not possible to assign a 4G bearer ID for the 5G QoS flow. It may be possible to establish a default 5G QoS flow or a GBR 5G QoS flow without assigning a 4G bearer ID and 4G QoS information.

Even if it is possible to establish a default 5G QoS flow or a GBR 5G QoS flow, the system may allow for prioritization of the available 4G bearer IDs, and it may be possible to assign these to the 5G QoS flow with the highest priority. A consequence of this is that it should also be possible for the system to withdraw a previously assigned 4G bearer ID. If this is done, all network functions (SMF 108, UE 101 and optionally the RAN 103) affected by the 5G QoS flow needs to be informed that the 5G QoS flow have no longer an assigned 4G bearer ID.

If it should be possible to withdraw previously assigned 4G bearer IDs, the network function responsible for the assignment need to be aware of the priority of the 5G QoS flows. To indicate this priority, ARP can be used, or a new priority parameters could be introduced. If the number of flows that requires a 4G bearer ID exceeds the allowed number of 4G bearer IDs in 4G, it may be possible for the 5G system to assign 4G bearer IDs to the 5G QoS flows with the highest priority.

The network function responsible for the assignment of 4G bearer IDs may also be responsible to do this prioritization. To do this, the network function may need to:
1. Have knowledge about the priority of both the 5G QoS flow for which a 4G bearer ID shall be assigned
2. Have knowledge of the priority of all flows that have already an assigned 4G bearer ID.

When selection which network function that shall assign the 4G bearer ID, both the case where the 4G bearer ID can be assigned within the available range of 8 values and the case when the number of requested 4G bearer IDs exceeds 8 may be considered. The case with priority between the different 5G QoS flow may be the case that puts a high requirements on the assignment function.

In 4G, the UE 101 has no knowledge of the ARP, or any other indication of the admission priority between flows. Instead the AMF 105 may be responsible for the assignment of the 4G bearer ID including the decision of which 5G QoS flows that shall have the available 4G bearer IDs when the number of requested 4G bearer IDs exceeds 8. The assignment of the 4G bearer IDs may therefore be performed by the AMF 105.

4G Bearer ID Assigning

Below is a description about when a new 5G QoS flow is authorized for an already established session (PDU session modification). Similar behavior may also apply if the 5G QoS flow is authorized in the PDU session establishment procedure.

In the description below, two options for how the interaction between the SMF 108 and the AMF 105 can be done, in alternative 1, the AMF 105 acts upon the reception of the PDU session modification command, and assigns the 4G bearer ID. In alternative 2, the SMF 108 requests a 4G bearer ID from the AMF 105 before initiating the PDU session modification.

Successful 4G Bearer ID Assignment in AMF 105

A successful 4G bearer ID assignment, when the UE 101 have not yet more than 8 5G QoS flows with assigned 4G bearer IDs.

Alternative 1—Triggered by SM Request with PDU Session Modification Command

Figure 11:
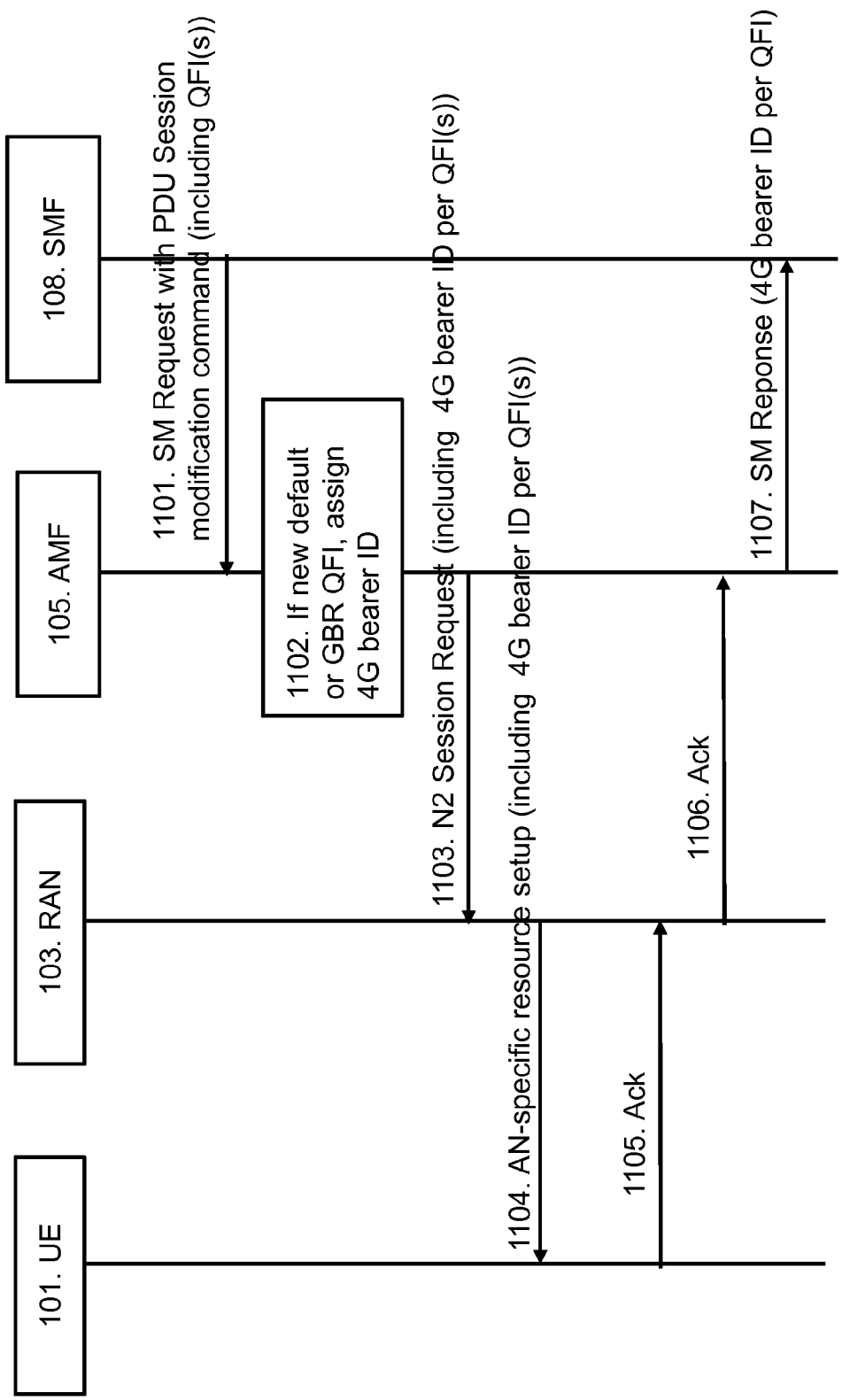
FIG. 11 is a signaling diagram illustrating embodiments of a method.

This alternative 1 is illustrated in FIG. 11. The method illustrated in FIG. 11 comprises at least one of the following steps, which steps may be performed in any suitable order than described below:

Step 1101
The SMF 108 sends a SM Request with PDU Session modification command including QFI(s) to the AMF 105.

Step 1102
If there is a new default or GBR QFI, then the AMF 105 assigns a 4G bearer ID.

Step 1103
The AMF 105 sends a N2 Session Request including the 4G bearer ID per QFI(s) to the RAN 103.

Step 1104
The RAN 103 sends an AN-specific resource setup including the 4G bearer ID per QFI(s) to the UE 101.

Step 1105
The UE 101 sends an Ack to the RAN 103.

Step 1106
The RAN 103 sends an Ack to the AMF 105.

Step 1107
The AMF 105 sends a SM Response (4G bearer ID per QFI) to the SMF 108.

In the example illustrated in FIG. 11, the AMF 105 does not have to be aware if the QFI is a default or GBR 5G flow to decide if the QFI shall have a 4G bearer ID. This can instead be indicated by the SMF 108, for example that the AMF 105 only assigns 4G bearer ID for 5G QoS flows that have associated 4G QoS information.

Alternative 2—Triggered by SM Request for 4G Bearer ID

Figure 12:
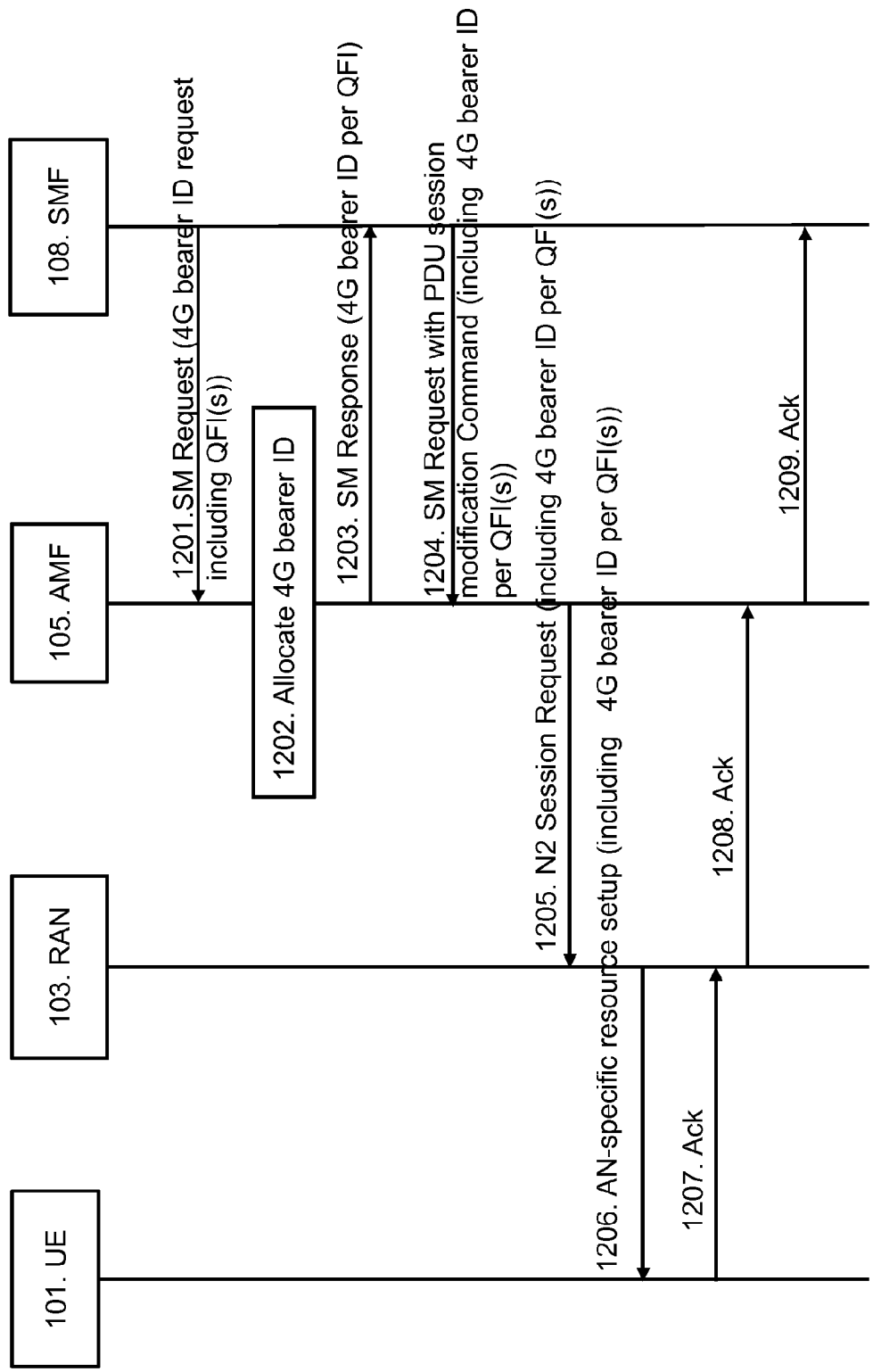
FIG. 12 is a signaling diagram illustrating embodiments of a method.

This alternative 2 is illustrated in FIG. 12. The method illustrated in FIG. 12 comprises at least one of the following steps, which steps may be performed in any suitable order than described below:

Step 1201

The SMF 108 sends a SM Request (4G bearer ID request including QFI(s)) to the AMF 105.

Step 1202

Upon receipt of the request in step 1201, the AMF 105 assigns a 4G bearer ID.

Step 1203

The AMF 105 sends a SM Response (4G bearer ID per QFI) to the SMF 108.

Step 1204

The SMF 108 sends a SM Request with PDU session modification command (including 4G bearer ID per QFI(s)) to the AMF 105.

Step 1205

The AMF 105 sends a N2 Session Request (including 4G bearer ID per QFI(s)) to the RAN 103.

Step 1206

The RAN 103 sends an AN-specific resource setup (including 4G bearer ID per QFI(s)) to the UE 101.

Steps 1207-1209

The UE 101 sends an Ack to the RAN 103. The RAN 103 sends an Ack to the AMF. The AMF 105 sends an Ack to the SMF 108.

Un-Successful 4G Bearer ID Assignment in AMF 105

This section describes the solution if the allowed number of 4G bearer IDs (8) has already been assigned by the network. When a new 5G QoS flow is authorized, the 5G QoS flow is established, but no 4G bearer ID is assigned for the 5G QoS flow. In this description no prioritization of which flows that shall have an assigned 4G bearer ID is done.

Alternative 1—Triggered by SM Request with PDU Session Modification Command

Figure 13:
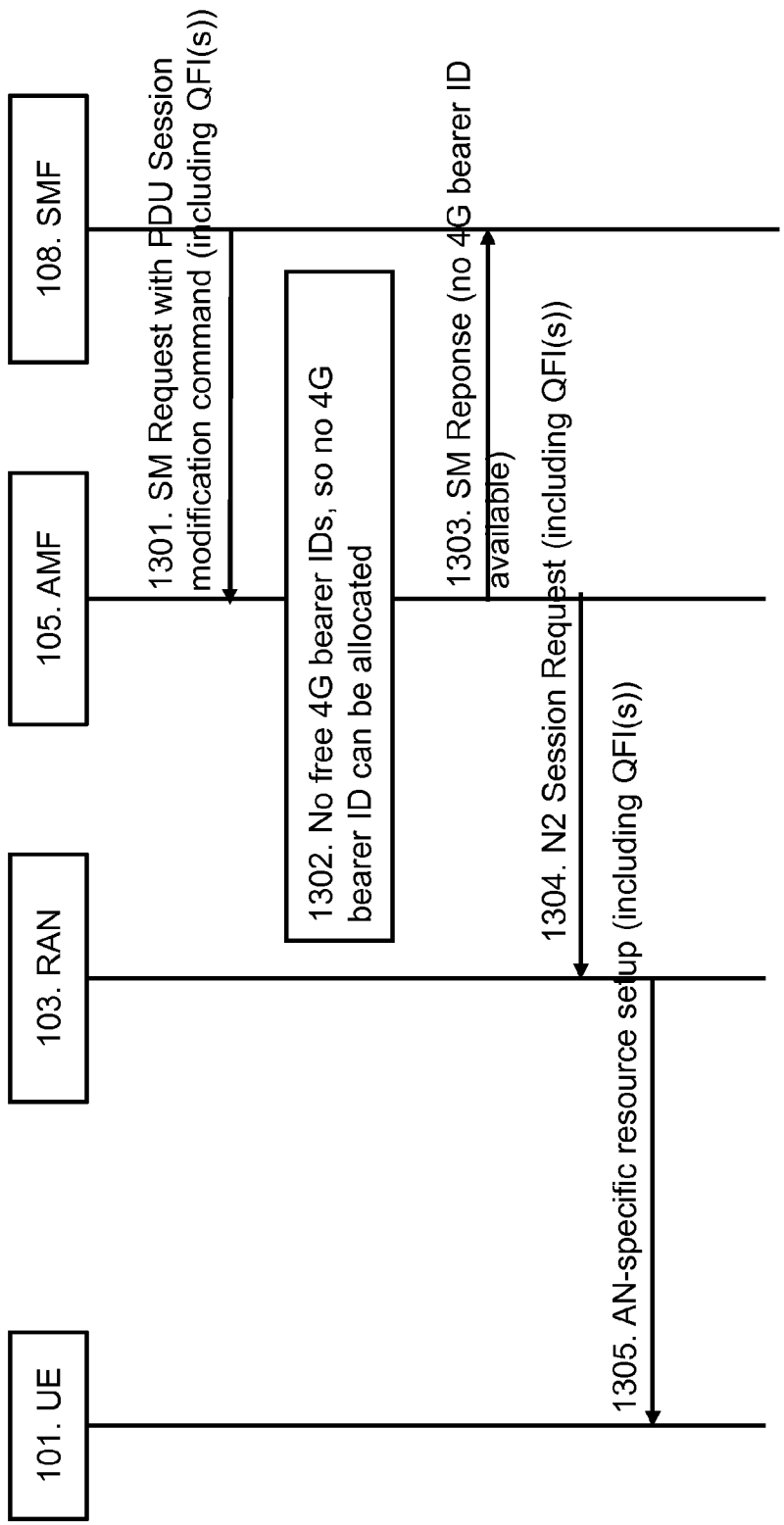
FIG. 13 is a signaling diagram illustrating embodiments of a method.

This alternative 1 is illustrated in FIG. 13. The method illustrated in FIG. 13 comprises at least one of the following steps, which steps may be performed in any suitable order than described below:

Step 1301

The SMF 108 sends a SM Request with PDU Session modification command (including QFI(s)) to the AMF 105.

Step 1302

There are no free 4G bearer IDs, so no 4G bearer ID can be assigned.

Step 1303

The AMF 105 sends a SM Response to the SMF 108 informing it that there are no 4G bearer ID available.

Step 1304

The AMF 105 sends a N2 Session Request (including QFI(s)) to the RAN 103.

Step 1305

The RAN 103 sends an AN-specific resource setup (including QFI(s)) to the UE 101.

Alternative 2—Triggered by SM Request for EBI

Figure 14:
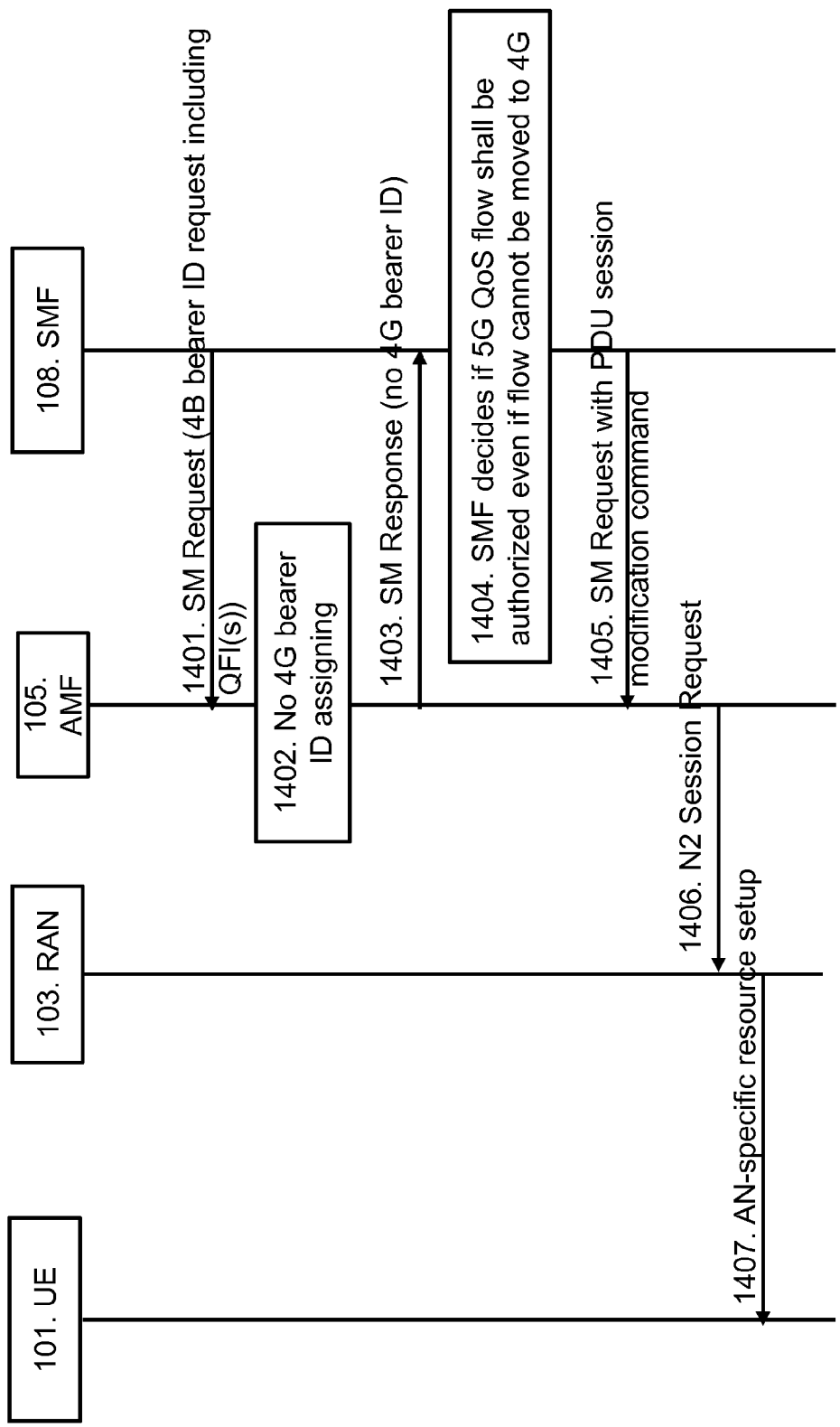
FIG. 14 is a signaling diagram illustrating embodiments of a method.

This alternative 1 is illustrated in FIG. 14. The method illustrated in FIG. 14 comprises at least one of the following steps, which steps may be performed in any suitable order than described below:

Step 1401

The SMF 108 sends a SM Request (4G bearer ID request including QFI(s)) to the AMF 105.

Step 1402

There are no available 4G bearer IDs, so the AMF 105 does not perform any 4G bearer ID assigning.

Step 1403

The AMF 105 sends a SM Response (no 4G bearer ID) to the SMF 108.

Step 1404

The SMF 108 decides if the 5G QoS flow shall be authorized even if flow cannot be moved to 4G.

Step 1405

The SMF 108 sends a SM Request with PDU session modification command to the AMF 105.

Step 1405

The AMF 105 sends a N2 Session Request to the RAN 103.

Step 1406

The RAN 103 sends an AN-specific resource setup to the UE 101.

Priority Based 4G Bearer ID Assignment in AMF 105

This section describes if the allowed number of 4G bearer IDs (8) have already been assigned by the network. When a new 5G QoS flow is authorized (QFI_new in the figures), the function responsible for the assignment of 4G bearer ID do a prioritization between 5G QoS flows that have already been assigned a 4G bearer ID and the new 5G QoS. If the new 5G QoS flow has higher priority than the flows that have a 4G bearer ID, the already assigned 4G bearer ID is removed from the old flow and assigned to the new 5G QoS flow. In order to illustrate the requirements for the solution, the figures shows a scenario where the different flows are authorized by different SMFs 108.

Alternative 1—Triggered by SM Request with PDU Session Modification Command

Figure 15:
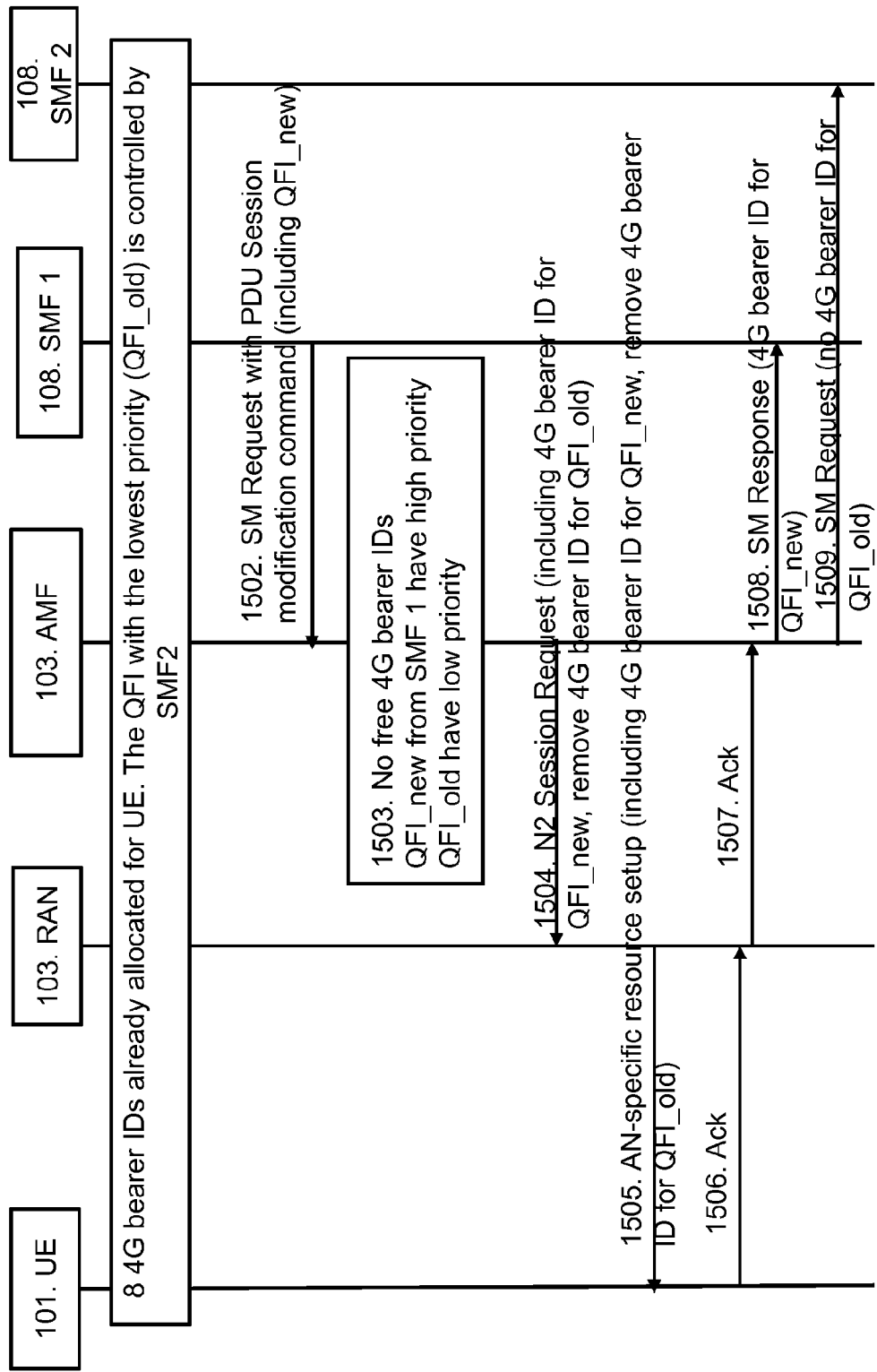
FIG. 15 is a signaling diagram illustrating embodiments of a method.

This alternative 1 is illustrated in FIG. 15. 8 4G bearer IDs already assigned for UE 101. The QFI with the lowest priority (QFI_old) is controlled by SMF2 108. The method illustrated in FIG. 15 comprises at least one of the following steps, which steps may be performed in any suitable order than described below:

Step 1501

The SMF 1 108 sends a SM Request with PDU Session modification command (including QFI_new) to the AMF 105.

Step 1502

The AMF 105 determines that there are no free 4G bearer IDs. The AMF 105 also determines that the QFI_new from SMF 1 108 have high priority and that the QFI_old have low priority.

Step 1503

The AMF 105 sends a N2 Session Request (including 4G bearer ID for QFI_new, remove 4G bearer ID for QFI_old) to the RAN 103.

Step 1504

The RAN 103 sends an AN-specific resource setup (including 4G bearer ID for QFI_new, remove 4G bearer ID for QFI_old) to the UE 101.

Step 1505-1506

The UE 101 sends an Ack to the RAN 103, and the RAN 103 sends an Ack to the AMF 105.

Step 1507

The AMF 105 sends a SM Response (4G bearer ID for QFI_new) to the SMF 1 108.

Step 1508

The sends a SM Request (no 4G bearer ID for QFI_old) to the SMF 2 108.

Alternative 2—Triggered by SM Request for EBI

Figure 16:
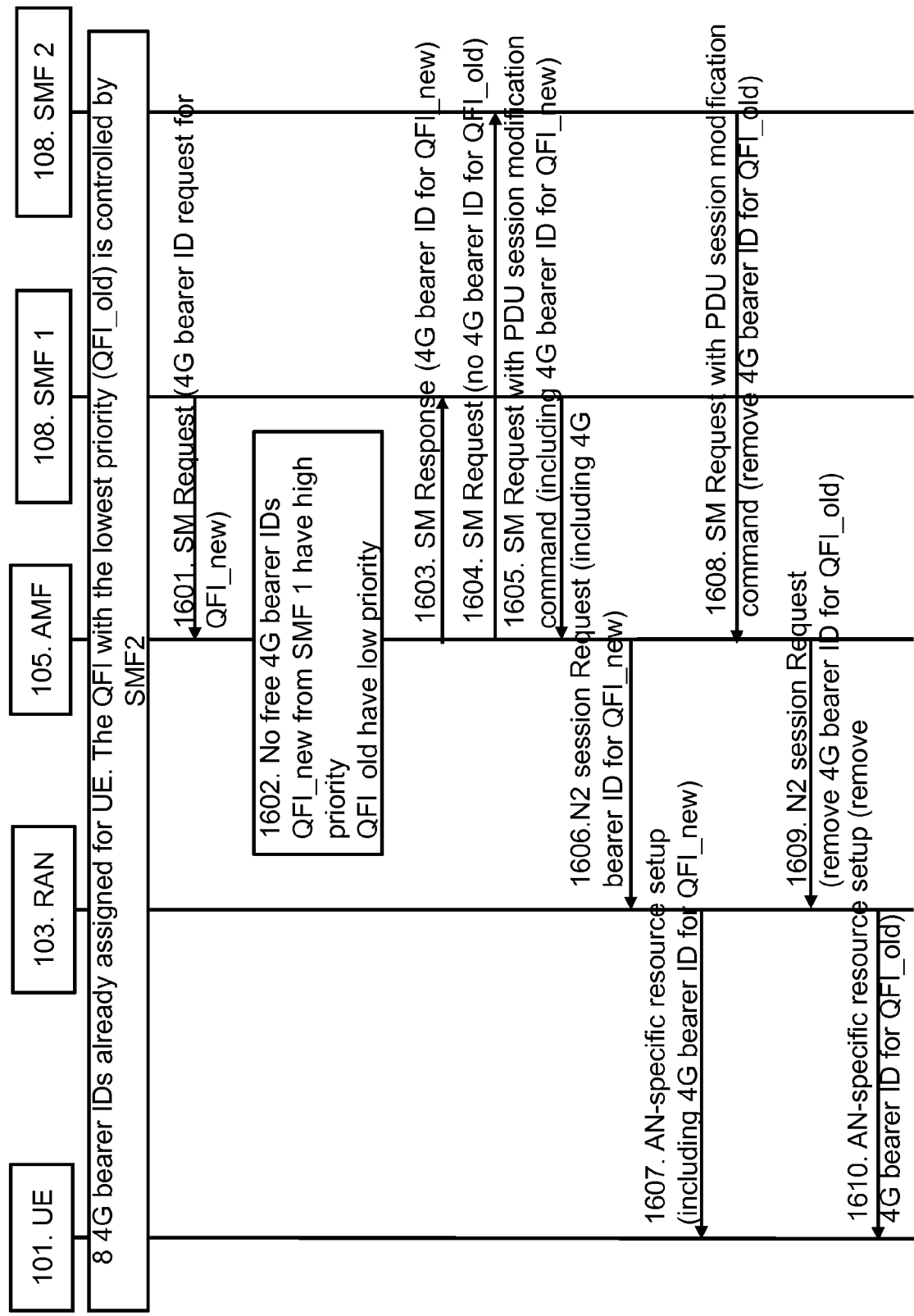
FIG. 16 is a signaling diagram illustrating embodiments of a method.

This alternative 2 is illustrated in FIG. 16. 8 4G bearer IDs already assigned for UE. The QFI with the lowest priority (QFI_old) is controlled by SMF2 108. The method illustrated in FIG. 16 comprises at least one of the following steps, which steps may be performed in any suitable order than described below:

Step 1601

The SMF 1 108 sends a SM Request (4G bearer ID request for QFI_new) to the AMF 105.

Step 1602

The AMF 105 determines that there are no free 4G bearer IDs, that the QFI_new from SMF 1 108 have high priority and that the QFI_old have low priority.

Step 1603

The AMF 105 sends a SM Response (4G bearer ID for QFI_new) to the SMF 1 108.

Step 1604

The AMF 105 sends a SM Request (no 4G bearer ID for QFI_old) to the SMF 2 108.

Step 1605

The SMF 1 108 sends a SM Request with PDU session modification command including 4G bearer ID for QFI_new) to the AMF 105.

Step 1606

The AMF 105 sends a N2 session Request (including 4G bearer ID for QFI_new) to the RAN 103.

Step 1607

The RAN 103 sends an AN-specific resource setup (including 4G bearer ID for QFI_new) to the UE 101.

Step 1608

The SMF 2 108 sends a SM Request with PDU session modification command (remove 4G bearer ID for QFI_old) to the AMF 105.

Step 1609

The AMF 105 sends a N2 session Request (remove 4G bearer ID for QFI_old) to the RAN 103.

Step 1610

The RAN 103 sends an AN-specific resource setup (remove 4G bearer ID for QFI_old) to the UE 101.

Figure 17A:
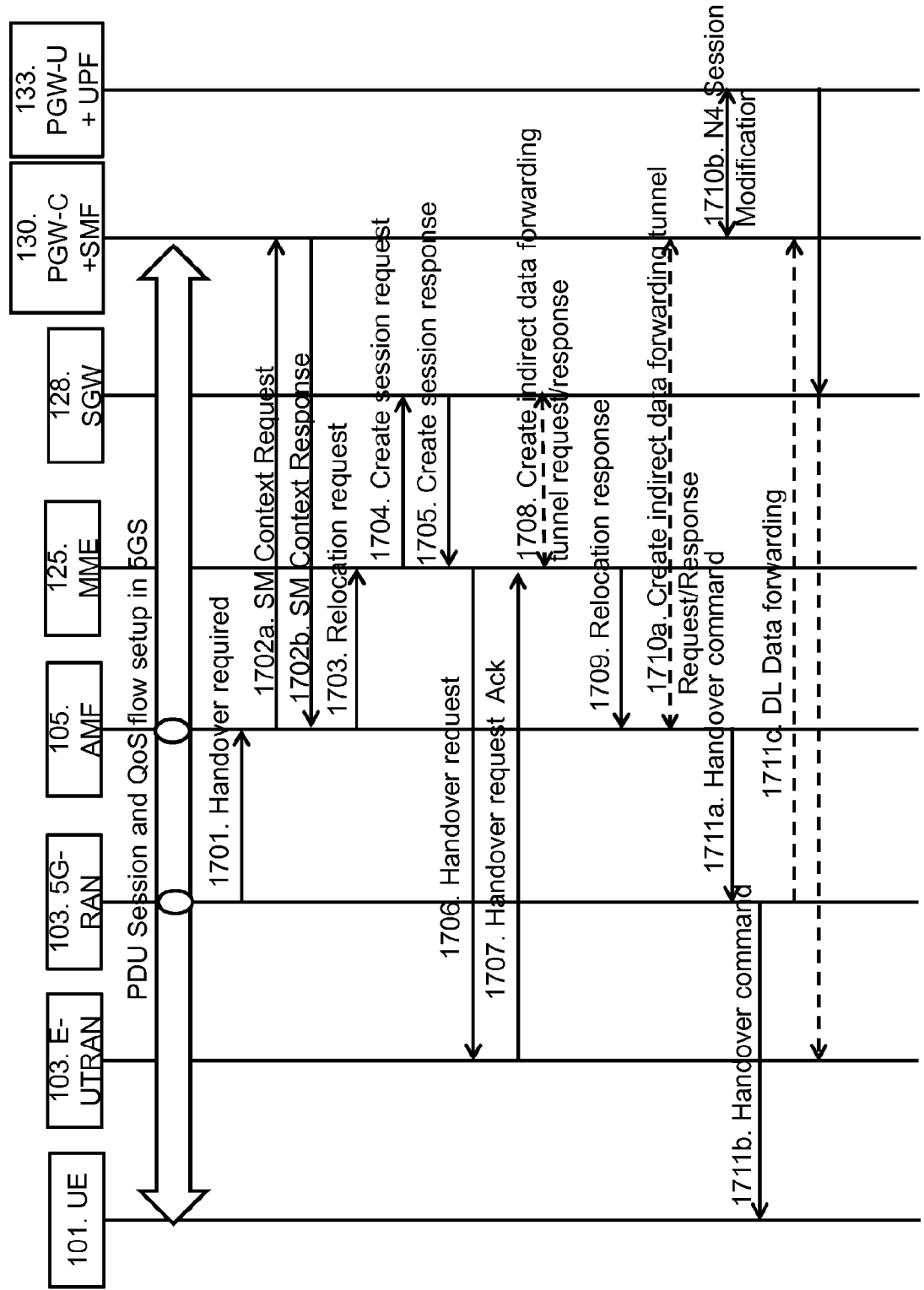
FIG. 17a is a signaling diagram illustrating embodiments of a method.
Figure 17B:
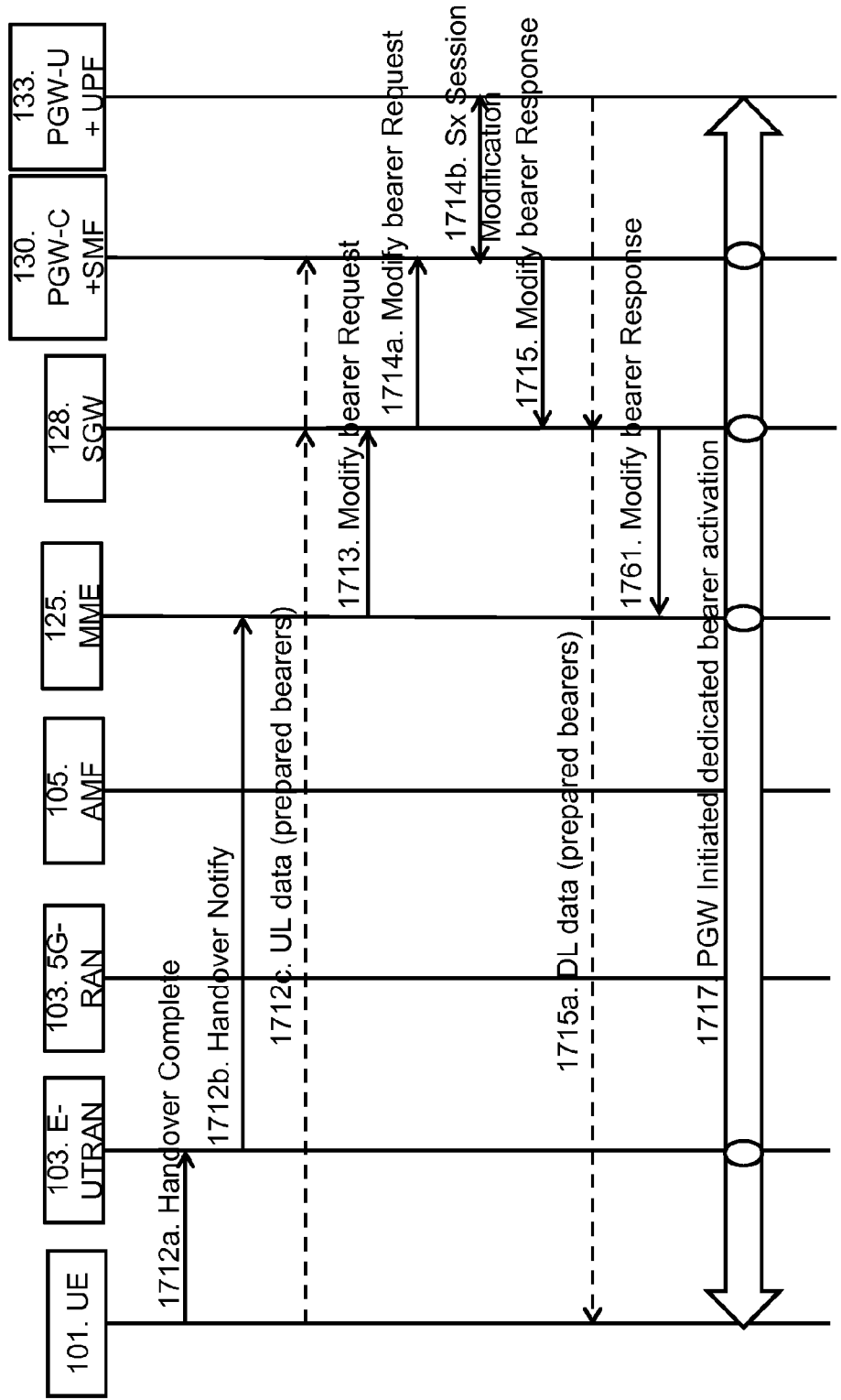

Handover Procedures for Single-Registration Mode: 5GS to 4G Handover Using Nx Interface The Nx interface, also referred to as a N26 interface, is used to provide seamless session continuity for single registration mode. FIGS. 17a and 17b describe the handover procedure from 5GS to 4G when Nx is supported, i.e. a 5GS to 4GS handover for single-registration mode with Nx interface. FIG. 17a shows steps 1600-1612 and FIG. 17b shows steps 1612a-1617. The steps in FIG. 17a are performed before the steps in FIG. 17b, i.e. FIG. 17b is a continuation of FIG. 17a.

The procedure in FIGS. 17a and 17b involve a handover to 4G and setup of default 4G bearer and dedicated bearers for GBR 5G QoS flows in 4G in steps 171-1716 and re-activation, if required, of dedicated 4G bearers for non-GBR 5G QoS flows in step 1717.

The UE 101 has one or more ongoing PDU sessions each including one or more 4G QoS flows. During the PDU session establishment and the GBR QoS flow establishment, the 4G QoS mappings and the 4G bearer IDs are assigned such that non-GBR 5G QoS flows map to a default 4G bearer (which is assigned an 4G bearer ID) and the 4G bearer IDs are assigned for the GBR 5G QoS flows that are mapped to dedicated bearers in the 4G. The 4G bearer ID for this bearer is also provided to the UE 101 and PGW-C+SMF. The mapped 4G QoS information is provided by the PGW-C+SMF. The mapped 4G QoS information may be provided to the PGW-C+SMF by the PCF+PCRF, if the PCC is deployed. The 4G bearer IDs are assigned by the AMF 103. The 5G QoS flows without a 4G bearer ID will after the mobility be sent on the default 4G bearer.

If the number of 5G QoS flows requesting an 4G bearer ID exceeds the number of available 4G bearer IDs in 4G, the 5G QoS flow can be authorized in 5G without an 4G bearer ID. It may be possible for a 5G QoS flow with a high priority to be assigned a 4G bearer ID that was previously assigned to another 5G QoS flow with lower priority.

FIG. 17a and FIG. 17b shows the following entities which are involved in the method:

UE 101
E-UTRAN 103
5G RAN 103
AMF 105
MME 125
SGW 128
PGW-C+SMF 130
PGW-U+UPF 133

The 5G-RAN 103 may also be referred to as a NG-RAN. The box with PGW-C+SMF refers to a unit dedicated for interworking.

The method in FIGS. 17a and 17b comprise at least one of the following steps, which steps may be performed in any suitable order than described below:

Step 1700

This step is seen in FIG. 17a. The PDU Session and QoS flow is setup in 5GS.

Step 1701

This step is seen in FIG. 17a. The 5G RAN 103 decides that the UE 101 should be handed over to the E-UTRAN 103. The 5G RAN 103 sends a Handover Required message to the AMF 105. The Handover Required message comprises at least one of the following information:

Target eNB ID
Source to Target Transparent Container

The AMF 105 receives the Handover Required message form the 5G RAN 103.

Step 1702a

This step is seen in FIG. 17a. The AMF 105 determines from the 'Target eNB Identifier' IE that the type of handover is Handover to E-UTRAN 103. The AMF 105 requests the PGW-C+SMF 130 to provide a SM Context that also includes the mapped 4G bearer Contexts. The request is done by that the AMF 105 sends a SM Context Request message to the PGW-C+SMF 130. This step is performed with all PGW-C+SMFs 130 allocated to the UE 101. This step should be aligned with intra 5GC inter-AMF handover. In roaming scenario, the UE's SM 4G Contexts are obtained from the V-SMF.

Step 1702b

This step is seen in FIG. 17a. The PGW-COSMF 130 sends a SM Context Response message to the AMF 105.

Step 1703

This step is seen in FIG. 17a. The AMF 105 selects an MME 125 and sends a Relocation Request message to the MME 125. The message comprises at least one of the following information:

Target E-UTRAN Node ID,
Source to Target Transparent Container,
Mapped MM, and
SM 4G UE Context (default and dedicated GBR bearers).

The SGW 128 address and TEID for both the control-plane or 4G bearers in the message are such that target MME selects a new SGW.

Step 1704

This step is seen in FIG. 17*a*. The MME 125 selects the Serving GW 128 and sends a Create Session Request message for each PDN connection to the Serving GW 128.

Step 1705

This step is seen in FIG. 17*a*. The Serving GW 128 allocates its local resources and returns them in a Create Session Response message to the MME 125.

Step 1706

This step is seen in FIG. 17*a*. The MME 125 requests the target eNodeB 103 to establish the bearer(s) by sending the message Handover Request message to the E-UTRAN 103. This message also contains a list of 4G bearer IDs that need to be setup.

Step 1707

This step is seen in FIG. 17*a*. The target eNB 103 allocates the requested resources and returns the applicable information to the target MME 125 in the message Handover Request Acknowledge. The applicable information may be at least one of the following:

Target to Source Transparent Container,
4G bearers setup list,
4G bearers failed to setup list.

Step 1708

This step is seen in FIG. 17*a*. This is an optional step, as indicated with the dotted arrow. If the MME 125 decides that indirect forwarding applies, it sends a Create Indirect Data Forwarding Tunnel Request message to the Serving GW 128. The message may comprise at least one of the following information:

Target eNB Address,
TEID(s) for DL data forwarding.

The Serving GW 128 returns a Create Indirect Data Forwarding Tunnel Response message to the target MME 125. The message may comprise at least one of the following information:

Cause,
Serving GW Address(es) and
Serving GW DL TEID(s) for data forwarding.

Step 1709

This step is seen in FIG. 17*a*. The MME 125 sends the message Relocation Response message to the AMF 105. The message comprises at least one of the following information:

Cause,
List of Set Up RABs,
4G bearers setup list,
MME Tunnel Endpoint Identifier for Control Plane,
RAN Cause,
MME Address for Control Plane,
Target to Source Transparent Container,
Address(es) and TEID(s) for Data Forwarding.

Step 1710*a*

This step is seen in FIG. 17*a*. If indirect forwarding applies, the AMF 105 forwards to the PGW-C+SMF 130 the information related to data forwarding to the SGW 128. The PGW-C+SMF 130 returns a Create Indirect Data Forwarding Tunnel Response.

Step 1710*b*

This step is seen in FIG. 17*a*. The PGW-C+SMF 130 and the PGW-U+UPF 133 enables N4 Session Modification.

Step 1711*a* and 1711*b*

These steps are seen in FIG. 17*a*. The AMF 105 sends the Handover Command to the source 5G RAN 103 (Step 1711*a*). The source 5G RAN 103 commands the UE 101 to handover to the target access network by sending the HO Command (Step 1711*b*). This message includes a transparent container including radio aspect parameters that the target eNB 103 has set-up in the preparation phase. The UE 101 correlates the ongoing QoS flows with the indicated 4G bearer IDs to be setup in the HO command. The UE 101 locally deletes the 5G QoS flows that do not have a 4G bearer ID assigned.

Step 1711*c*

This step is seen in FIG. 17*a*. This is an optional step, as indicated with the dotted arrow. DL Data forwarding may take place from the 5G RAN 103 to the PGW-C+SMF 130, and from the PGW-U+UPF 133 via the SGW 128 to the E-UTRAN 103.

Step 1712*a* and 1712*b*

These steps are seen in FIG. 17*b*. When the UE 101 has successfully accessed the target eNodeB 103, the target eNodeB 103 informs the target MME by sending the message Handover Notify.

Step 1712*c*

This step is seen in FIG. 17*b*. UL data may be sent from the UE 101 to the PGW-C+SMF 130, e.g. via the SGW 128, and possibly using prepared beares.

Step 1713

This step is seen in FIG. 17*b*. The target MME 130 informs the Serving GW 128 that the MME 130 is responsible for all the bearers the UE 101 have established by sending the Modify bearer Request message for each PDN connection. The target MME 130 releases the non-accepted 4G bearer contexts by triggering the bearer context deactivation procedure. If the Serving GW 128 receives a DL packet for a non-accepted bearer, the Serving GW 128 drops the DL packet and does not send a Downlink Data Notification to the SGSN.

Step 1714*a* and 1714*b*

These steps are seen in FIG. 17*b*. The Serving GW informs the PGW-C+SMF of the relocation by sending the Modify bearer Request message for each PDN connection. The PGW-C+SMF 130 locally deletes the QoS flows that do not have an 4G bearer ID assigned. Due to the "match all" filter in the default QoS flow, the PGW-C+SMF 130 maps the IP flows of the deleted QoS flows to the default QoS flow. The PGW-C-UPF 133 and the PGW-U+SMF 130 execute Sx Session Modification.

Step 1715

This step is seen in FIG. 17*b*. The PGW-C+SMF 130 acknowledges the Modify bearer Request by sending a Modify bearer Response message to the SGW 128. At this stage the User Plane path is established for the default bearer and the dedicated GBR bearers between the UE, target eNodeB 103, Serving GW 128 and the PGW-C+SMF 130.

Step 1715*a*

This step is seen in FIG. 17*b*. DL data may be sent from the PGW-U+UPF 113 to the UE 101 via the SGW 128.

Step 1716

This step is seen in FIG. 17*b*. The SGW 128 acknowledges the User Plane switch to the MME 125 via the message Modify bearer Response.

Step 1717

This step is seen in FIG. 17*b*. The PGW-C+SMF 130 initiates dedicated bearer activation procedure for non-GBR QoS flows by mapping the parameters of the non-GBR flows to 4G QoS information. This setup may be triggered by the PCRF+PCF (not illustrated in FIG. 17) which may also provide the mapped QoS information, if PCC is deployed.

Summarized, if the SMF 108 requests 4G bearer ID from the AMF 105 before initiating the PDU session modification, the AMF 105 does not need to know which QFIs that are associated with default QoS requirements and GBR QoS requirements. Instead it is the SMF 108 that controls which QFIs that shall have a 4G bearer ID, and only request the 4G bearer ID for those flows.

It has been proposed that the AMF 105 assigns 4G bearer IDs to a corresponding 5G QoS flow when 4G QoS information is provided by the SMF+PGW-C 130. A 4G bearer ID must be a unique ID for a UE 101 and a function common to all UE handling such that the AMF 105 is suitable to guarantee uniqueness of a 4G bearer ID assigned to a UE 10. An SMF 108 does in this respect not have the same qualities as the AMF 105. AMF 105 will attempt to assign a 4G bearer ID if the SMF-PGW-C 130 provides 4G QoS information at setup of a 5G QoS flow in the 5G access.

A potential and probable 3GPP approach is that the AMF 105 is allowed to use a copy of SM-related session data. This enables the AMF 105 to prioritize between 4G resources but leaves to the SMF+PGW-C 130 to execute related SM procedures to realize the prioritization made by the AMF 105.

To perform at least some of the method steps shown in FIGS. 2-17 a node may comprise an arrangement as shown in FIG. 18. The node may be for example the first node 103,105 or the second node 108. The node comprises at least one of:

a receiving module 1801,
a transmitting module 1803,
a processor 1805,
a memory 1808, The transmitting module 1801 may also be referred to as a transmitting unit, a transmitting means, a transmitting circuit, means for transmitting, output unit etc. The transmitting module 1801 may be a transmitter, a transceiver etc. The transmitting module 1801 may be a wireless transmitter of the node a wireless or fixed communications system.

The receiving module 1803 may also be referred to as a receiving unit, a receiving means, a receiving circuit, means for receiving, input unit etc. The receiving module 1803 may be a receiver, a transceiver etc. The receiving module 1803 may be a wireless receiving of the node a wireless or fixed communications system.

The memory 1808 is arranged to be used to store data, received data streams, power level measurements, priority, QoS information, 4G bearer ID, threshold values, time periods, configurations, schedulings, and applications to perform the methods herein when being executed in the node, rejections, ARP etc. The memory 1808 comprises instructions executable by the processor 1805.

Those skilled in the art will also appreciate that the receiving module 1801 and the transmitting module 1803 described above may refer to a combination of analog and digital circuits, and/or one or more processors configured with software and/or firmware, e.g. stored in a memory, that when executed by the one or more processors such as the processor 1805 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The embodiments described herein may be implemented through one or more processors, such as a processor in the first node 105 and in the second node 108, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the first node 105 and/or the second node 108. One such carrier may be in the form of a CD ROM disc. It is however feasible with other data carriers such as a memory stick. The computer program code can furthermore be provided as pure program code on a server and downloaded to the first node 105 and/or the second node 108.

In some embodiments, a computer program may comprise instructions which, when executed on at least one processor, cause the at least one processor to carry out at least some of the steps in the methods illustrated in FIGS. 2-17. A carrier may comprise the computer program, and the carrier is one of an electronic signal, optical signal, radio signal or computer readable storage medium.

Figure 19:
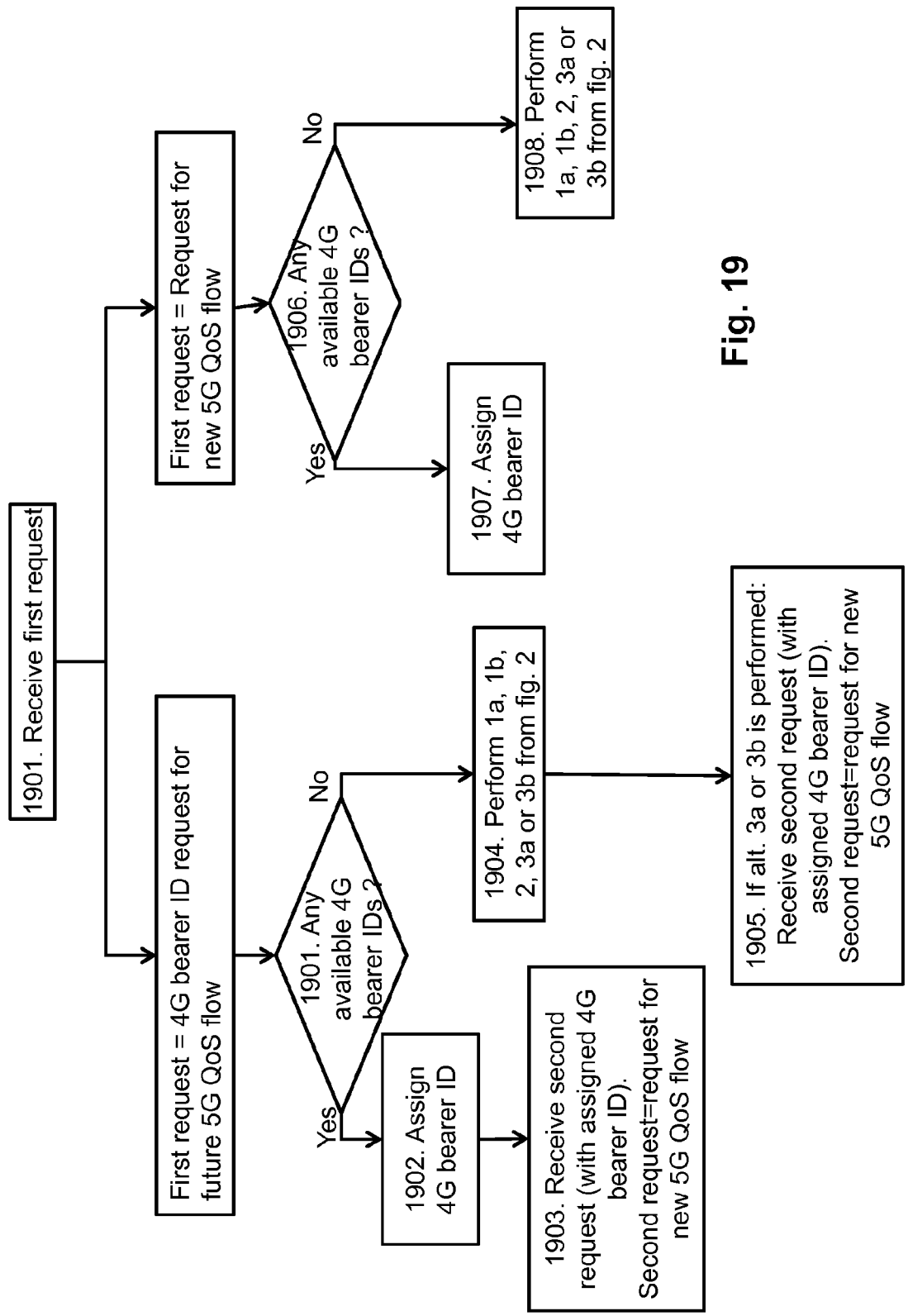
FIG. 19 is a signaling diagram illustrating embodiments of a method.

FIG. 19 illustrates an example of a method. The method comprises at least one of the following steps, which steps may be performed in any suitable order than described below:

Step 1901

The first node 103, 105 receives a first request from a second node 108. The first request may be a 4G bearer ID request for a future 5G QoS flow, and then at least some of steps 1901, 1902, 1903, 1904 and 1905 may be performed. The first request may be a request for a new 5G QoS flow, and then at least some of steps 1906, 1907 and 1908 may be performed.

Step 1901

This step is performed when the first request is a 4G bearer ID request for a future 5G QoS flow. Triggered by the receipt of the first request, the first node 103, 105 determines whether there are any available 4G bearer IDs. An action is then taken based on the determining.

Step 1902

This step is performed when the first request is a 4G bearer ID request for a future 5G QoS flow. When there are available 4G bearer IDs, indicated with yes in FIG. 19, the action is to assign a 4G bearer ID.

Step 1903

This step is performed when the first request is a 4G bearer ID request for a future 5G QoS flow. This step is performed after step 1902.

The first node 103, 105 receives a second request from the second node 108. The second request is a request for setup of a new 5QoS flow and the second request comprises an assigned 4G bearer ID.

Step 1904

This step is performed when the first request is a 4G bearer ID request for a future 5G QoS flow. When there are no available 4G bearer IDs, indicated with "no" in FIG. 19, the action is to perform any of the alternatives 1a, 1b, 2, 3a or 3b described herein, e.g. in FIG. 2.

Step 1905

This step is performed when the first request is a 4G bearer ID request for a future 5G QoS flow. If alt. 3a or 3b is performed, then the first node 103, 105 receives a second request from the second node. The second request is a request for setup of a new 5QoS flow and the second request comprises an assigned 4G bearer ID.

Step 1906

This step is performed when the first request is a request for a new 5G QoS flow. Triggered by the receipt of the first request, the first node 103, 105 determines whether there are any available 4G bearer IDs. An action is then taken based on the determining.

Step 1907

This step is performed when the first request is a request for a new 5G QoS flow. When there are available 4G bearer IDs, indicated with yes in FIG. 19, the action is to assign a 4G bearer ID.

Step 1908

This step is performed when the first request is a request for a new 5G QoS flow. When there are no available 4G bearer IDs, indicated with "no" in FIG. 19, the action is to perform any of the alternatives 1a, 1b, 2, 3a or 3b described herein, e.g. in FIG. 2.

Wherein the first request comprises at least part of QoS information or does not comprise any of the QoS information.

Wherein the first request is a request for setup of a new 5G QoS flow comprising both 5G and 4G QoS information, and wherein the determining is further triggered by that the request comprises 4G QoS information and/or are 5G QoS of type default QoS Flow or GBR QoS Flow.

The 5G system assigns 4G properties at the time when these 5G resources are allocated for the UE. 4G properties consist of two elements:

1) 4G QoS: It is assumed that when the first node 103, 105 receives a request for allocating 5G resources, and the flow is applicable for continuation in 4G, the 4G QoS information is also received.

2) 4G Bearer ID: It is proposed that the first node 103, 105 assigns a 4G bearer ID and keep track of that the limit of maximum 8 4G bearers supported by a 4G system is not violated.

At doing so, the embodiments herein let the first node 103, 105 interact at each event of 5G resource allocation and intervene w.r.t. 4G properties such that:

1) The first node 103, 105 rejects the 4G properties of a 5G resource allocation request for low prioritized requests.

2) The first node 103, 105 deactivates (removes) 4G resources allocated for a UE 101 when more prioritized resources are requested; this when the 4G "resource ceiling" of max 8 EPS bearers has been reached for the UE This selective reject of only 4G properties for a 5G request of use in the 5G access enables the UE 101 and 5G network to operate unaffected as long as the UE 101 remains served by the 5G access. This selective deactivation (removal) of only 4G resources allocated for a UE 101 when more prioritized resources are requested, enables the UE 101 and 5G network to operate unaffected as long as the UE 101 remains served by the 5G access.

If the UE 101 later attempts to change access from 5G to 4G only resources that are provided with 4G properties are subject to be translated and made available in 4G.

Some embodiments can be summarized as follows:

A method performed by a first node 103, 105 for handling QoS information. The method comprises:

Receive 201, 301 information for a 5G QoS flow from a second node 108. The information comprises 5G or 4G QoS information, or both 5G and 4G QoS information, or priority information.

Determine 202, 302 whether there are any available 4G bearer IDs.

When there are no available 4G bearer IDs, determine 206, 207, 208, 209, 210, 211, 212, 213, 215, 303, 304, 305, 308. 309, 310 an action for handling the information.

The method performed by a first node 103, 105 may further comprise:

Receive 301 a request for assigning a 4G bearer ID for a future 5G QoS flow from a second node 108. The request comprises at least part of the information or does not comprise any of the information.

The determining 202, 306 whether there are any available 4G bearer IDs may be triggered by that the information comprises 4G QoS information or triggered by receiving a request.

The method performed by the first node 103, 105 may further comprise:

When there is at least one available 4G bearer ID, assign 205, 303 the 4G bearer ID.

Send 303 information to the second node 108 about the assigned 4G bearer ID.

Set up 305 a new 5G QoS flow with the assigned 4G bearer ID.

The request may further comprise the assigned 4G bearer ID.

The action may comprise:

Reject 206, by the first node 103, 105, the 5G QoS flow; and

Send 207, 208, from the first node 103, 105, information regarding that the rejection is due to the unavailability of 4G bearer IDs to the second node 108.

When the information comprises both 5G and 4G QoS information, the action comprises:

Accept 209, by the first node 103, 105. the 5G QoS flow;

Remove 209, by the first node 103, 105, the 4G QoS information from received information when the 5G QoS flow has been accepted;

Forward 210, from the first node 103, 105, the QoS information for the 5G QoS flow comprising the 5G QoS information to at least one of: the radio access network and the UE 101;

Send 210, from the first node 103, 105, information about the removal of 4G QoS information to the second node 108.

The action may comprise:

Pre-empt 214, 310, by the first node 103, 105, a low prioritized 4G QoS flow including its 4G bearer ID. A 4G bearer ID may be available after the pre-emption.

Send 212, from the first node 103, 105, information about the pre-emption to at least one of: the same second node from which the QoS information was received, another second node 108, the radio access network and the UE 101.

Assign 215, from the first node 103, 105, a 4G bearer ID to the 5G QoS flow after the pre-emption has been done.

The action may comprise:

Pre-empt 212, 309, by the first node 103, 105, a low prioritized 4G QoS flows and its associated 5G QoS flow.

Send 214, from the first node 103, 105, information about the pre-emption to at least one of: the same second node from which the QoS information was received, another second node, the radio access network and the UE 101.

Assign 215, by the first node 103, 105, a 4G bearer ID to the 5G QoS flow after the pre-emption has been done.

The method performed by the first node 103, 105 may further comprise:

Obtain 211 priority information for a 4G QoS flows. The priority information may be obtained from the second node 108 or obtained by being predetermined in the first node 103, 105.

There may be no available 4G bearer IDs when the total number of already assigned 4G bearer IDs exceeds a threshold. The threshold may be 8 4G bearer IDs 10 4G bearer IDs, or 15 bearers.

The first node 103, 105 may be an Access and Mobility Management Function, AMF, a mobility function, an mobility node or a Radio Access Network, RAN, node 103.

A method performed by a second node 108 for handling QoS information comprises:
Send 201, 301 information for a 5G, QoS flow to a first node 103, 105. The information comprises 5G or 4G QoS information, or both 5G and 4G QoS information, or priority information.

The method performed by the second node 108 may further comprise:
Receive 208 information regarding unavailability of 4G bearer IDs from the first node 103, 105.
Based on the received information, determine 208 whether to continue the 5G QoS flow or to stop the 5G QoS flow.

The method performed by the second node 108 may further comprise:
Reauthorize 208 the 5G QoS flow without the 4G QoS information when it has been determined to continue the 5G QoS flow.

The method performed by the second node 108 may further comprise:
Receive the 4G QoS information from a policy node 115.
The second node 108 may be a SMF, a session function or a session node.

A first node 103, 105 for handling QoS information, where the first node is configured to perform the method as described herein.

A second node 108 for handling QoS information, where the second node 108 is configured to perform the method as described herein.

A communication system comprises the first node 103, 105 and the second node 108.

The 5G and 4G QoS information may have been assigned by the second node 108 at 5G QoS flow setup.

The 4G bearer ID may be referred to as an EPS Bearer ID.

The 4G QoS parameters may be referred to as EPS QoS parameters.

The 5G QoS information may be a QFI.

The term "reject" used herein may refer to the case when a response to a request message, where the request cannot be fulfilled, shall be rejected. A reject message may include a cause code that informs the original part of the reason for reject, or it can be known from the reject message itself. The sending part may then take different actions depending on the cause.

The term "remove" used herein may have the following two meanings:
1) Remove=When an intermediate node/function can "accept" a request message, but not the complete request and have to remove some parts of the request. In our context e.g. 4G QoS information must be removed by an intermediate node. After removal of this information in the affected node/function, the procedure can continue. When a node/function removes information from a request, the request can be partially accepted by informing the originator that some aspects of the request could not be fulfilled. It can be seen as some parts are rejected while some parts are accepted.
2) Remove may be a request message, where the request is to remove something. In this context we discuss a request for removal of the 4G QoS information. A request for removal of resources can usually not be rejected by the receiving part.

The term "Pre-Empt" used herein refers to acting instead of re-act. In the embodiments herein, the available number of 4G bearer ID's used in 4G has reached its maximum. Instead of re-act to that and have to reject the new request, it is possible to act and send a request for removal of existing resources to make room for the new request. It is to temporary stop the new/ongoing request until we have made room for the resources required for the request, and at that time the signaling flow can be resumed.

The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasised that the steps of the methods may, without departing from the embodiments herein, be performed in another order than the order in which they appear.

The invention claimed is:

1. A method performed by an Access and Mobility Management Function (AMF), the method comprising:
receiving an Evolved Packet System (EPS) bearer identifier (EBI) assignment request message;
determining that there are no available EBIs; and
after determining that there are no available EBIs:
(i) revoking an EBI associated with a 4G QoS flow;
(ii) requesting a second SMF to release Quality-of-Service (QoS) parameters corresponding to the revoked EBI, wherein the requesting comprises the AMF transmitting to the second SMF a message comprising the revoked EBI; and
(iii) sending to a first SMF an EBI assignment response message comprising the revoked EBI; and
after requesting the second SMF to release the QoS parameters, receiving a message transmitted by the second SMF, wherein the message transmitted by the second SMF comprises the revoked EBI.

2. The method of claim 1, further comprising:
receiving a request for assigning a EBI for a future 5G QoS flow from the first SMF.

3. The method of claim 1, wherein the step of determining that there are no available EBIs is performed in response to receiving the assignment request message.

4. The method of claim 1, further comprising:
obtaining priority information for the 4G QoS flows, wherein the priority information is obtained from the first SMF or obtained by being predetermined in the AMF.

5. The method of claim 1, wherein there are no available EBIs when the total number of already assigned EBIs exceeds a threshold.

6. A method performed by a Session Management Function (SMF), the method comprising:
receiving a request message transmitted by an Access and Mobility Management Function (AMF), wherein the request message comprises an Evolved Packet System (EPS) bearer identifier (EBI) that was revoked by the AMF, and further wherein the request message is a request for the SMF to release Quality-of-Service (QoS) parameters corresponding to the revoked EBI; and
in response to receiving the request message:
initiating the release of the QoS parameters corresponding to the revoked EBI; and
transmitting to the AMF a message comprising the revoked EBI.

7. The method of claim 6, further comprising
receiving information regarding unavailability of EBIs from the AMF; and
based on the received information, determining whether to continue a 5G QoS flow or to stop the 5G QoS flow.

8. The method of claim 7, further comprising:
reauthorizing the 5G QoS flow when it has been determined to continue the 5G QoS flow.

9. A first node for handling quality of service (QoS) information, the first node being configured to perform the method of claim 1.

10. A second node for handling quality of service (QoS) information, the second node being configured to perform the method of claim 6.

* * * * *

UNITED STATES PATENT AND TRADEMARK OFFICE
CERTIFICATE OF CORRECTION

Page 1 of 2

PATENT NO. : 11,323,386 B2
APPLICATION NO. : 16/611749
DATED : May 3, 2022
INVENTOR(S) : Dannebro et al.

It is certified that error appears in the above-identified patent and that said Letters Patent is hereby corrected as shown below:

In the Drawings

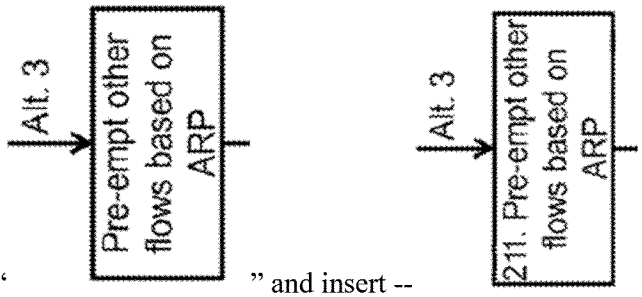

In Fig. 2, Sheet 3 of 21, delete "          " and insert --          --, therefor.

In Fig. 8, Sheet 9 of 21, for Tag "804", in Line 1, delete "recourse" and insert -- resource --, therefor at each occurrence throughout the figures (Figs. 8, 9 & 10).

In Fig. 9, Sheet 10 of 21, for Tag "902", in Line 4, delete "Pre-empty" and insert -- Pre-empts --, therefor at each occurrence throughout the figures (Figs. 9 & 10).

In Fig. 11, Sheet 12 of 21, for Tag "1107", in Line 1, delete "Reponse" and insert -- Response --, therefor at each occurrence throughout the figures (Figs. 11 & 13).

In the Specification

In Column 2, Line 26, delete "(SMF+PGW-C)" and insert -- (PGW-C+SMF) --, therefor.

In Column 2, Line 42, delete "SMF+PGW-C" and insert -- PGW-C+SMF --, therefor.

In Column 3, Line 13, delete "SMF+PGW-C." and insert -- PGW-C+SMF. --, therefor.

In Column 5, Line 48, delete "Node" and insert -- Network --, therefor.

Signed and Sealed this
Fourteenth Day of February, 2023

*Katherine Kelly Vidal*

Katherine Kelly Vidal
*Director of the United States Patent and Trademark Office*

In Column 8, Lines 36-37, delete "SMF+PGW-C." and insert -- PGW-C+SMF. --, therefor.

In Column 23, Line 57, delete "171-1716" and insert -- 1701-1716 --, therefor.

In Column 24, Line 57, delete "PGW-COSMF" and insert -- PGW-C+SMF --, therefor.

In Column 27, Line 8, delete "SMF+PGW-C" and insert -- PGW-C+SMF --, therefor.

In Column 27, Line 19, delete "SMF+PGW-C" and insert -- PGW-C+SMF --, therefor.

In Column 28, Line 50, delete "5QoS" and insert -- 5G QoS --, therefor.

In Column 28, Line 63, delete "5QoS" and insert -- 5G QoS --, therefor.